(12) United States Patent
Karlo et al.

(10) Patent No.: US 9,182,889 B1
(45) Date of Patent: Nov. 10, 2015

(54) PREVENTING UNINTENTIONAL USER ACTIVATION OF USER INTERFACE ELEMENTS

(71) Applicant: Google Inc., Mountain View, CA (US)

(72) Inventors: Thomas Ramon Karlo, San Francisco, CA (US); Lee Brandon Keely, San Francisco, CA (US); Daniel Marc Gatan Shiplacoff, Los Altos, CA (US); Jorim Dorian Jaggi, Zürich (CH); Selim Flavio Cinek, Zürich (CH); Adrian Roos, Zürich (CH); Michael Adam Cohen, Mountain View, CA (US); James Brooks Miller, Sunnyvale, CA (US); Christoph Studer, Zürich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/314,001

(22) Filed: Jun. 24, 2014

(51) Int. Cl.
*G06F 3/048* (2013.01)
*G06F 3/0482* (2013.01)
*G06F 3/0488* (2013.01)
*G06F 3/0481* (2013.01)

(52) U.S. Cl.
CPC .......... *G06F 3/0482* (2013.01); *G06F 3/0488* (2013.01); *G06F 3/04817* (2013.01)

(58) Field of Classification Search
CPC ... G06F 21/31; G06F 3/04812; G06F 3/0482; G06F 3/0488; G06F 3/0481
USPC ................ 715/741, 814, 823, 844, 860, 863; 345/173; 726/7, 19
See application file for complete search history.

(56) References Cited

U.S. PATENT DOCUMENTS

| 8,018,440 | B2 | 9/2011 | Townsend et al. |
| 8,497,884 | B2 | 7/2013 | Cholewin et al. |
| 8,543,942 | B1 | 9/2013 | Kumar |
| 8,560,975 | B2 | 10/2013 | Beaver et al. |

(Continued)

FOREIGN PATENT DOCUMENTS

| EP | 1284450 A2 | 2/2003 |
| EP | 2631779 A1 | 8/2013 |

(Continued)

OTHER PUBLICATIONS

Harrison, et al., "The Design and Use of Squeezable Computers: An Exploration of Manipulative User Interfaces," Xerox PARC, CHI'98, Apr. 18-23, 1998, 10 pp.

*Primary Examiner* — Haoshian Shih
(74) *Attorney, Agent, or Firm* — Shumaker & Sieffert, P.A.

(57) ABSTRACT

While a computing device is in a limited-access state, the computing device may output for display a user interface element. Responsive to the computing device receiving an indication of a first user input at a region of a presence-sensitive input device that corresponds to at least a portion of the user interface element as displayed, the computing device may alter the visual appearance of the user interface element to indicate that the user interface element is selected. Responsive to the computing device determining that it has received the indication of the second user input at the region of the presence-sensitive input device within the predefined period of time subsequent to receiving the indication of the first user input, the computing device may activate the user interface element.

23 Claims, 8 Drawing Sheets

(56) References Cited

U.S. PATENT DOCUMENTS

| | | |
|---|---|---|
| 8,600,450 B2 | 12/2013 | Bengtsson et al. |
| 8,601,561 B1 | 12/2013 | Cleron et al. |
| 8,619,100 B2 | 12/2013 | Capela et al. |
| 8,631,354 B2 | 1/2014 | Edge et al. |
| 2012/0331548 A1 | 12/2012 | Tseng et al. |
| 2014/0019253 A1 | 1/2014 | Ricasata |
| 2014/0043241 A1 | 2/2014 | Sukumar |
| 2014/0062893 A1 | 3/2014 | Kawalkar |

FOREIGN PATENT DOCUMENTS

| | | |
|---|---|---|
| EP | 2696260 A2 | 2/2014 |
| WO | 2009076974 | 6/2009 |
| WO | 2010136854 A1 | 12/2010 |
| WO | 2011143476 A1 | 11/2011 |
| WO | 2014046855 A1 | 3/2014 |

PREVENTING UNINTENTIONAL USER ACTIVATION OF USER INTERFACE ELEMENTS

BACKGROUND

Computing devices can perform various functions, such as executing applications stored at the computing device and outputting information for display (e.g., on a screen of the computing device). Certain computing devices can operate in a limited-access state that prevents unauthorized users from accessing applications and information stored at the computing device, thereby effectively "locking" the computing device. For example, some computing devices require a user to provide a specific input to lock and/or unlock the device. In the limited-access state, the computing device may output information (e.g., notifications) at a presence-sensitive display that may be easily glanceable by the user of the computing device, without requiring the user to provide specific input to unlock the computing device. However, such information may be selected in response to inadvertent touches at a presence-sensitive display, resulting in unintended selection of the information.

SUMMARY

In one aspect, the disclosure is directed to a method. The method may include, while a computing device is in a limited-access state, outputting, by the computing device and for display, a user interface element. The method may further include, responsive to receiving an indication, by a computing device, of a first user input at a region of a presence-sensitive input device that corresponds to at least a portion of the user interface element as displayed, altering, by the computing device, a visual appearance of the user interface element to indicate that the user interface element is selected. The method may further include responsive to determining that the computing device has not received an indication of a second user input at the region of the presence-sensitive input device within a predefined period of time subsequent to receiving the indication of the first user input, altering, by the computing device, the visual appearance of the user interface element to indicate that the user interface element is deselected. The method may further include responsive to determining that the computing device has received the indication of the second user input at the region of the presence-sensitive input device within the predefined period of time subsequent to receiving the indication of the first user input, activating, by the computing device, the user interface element.

In another aspect, the disclosure is directed to a computer-readable storage medium encoded with instructions that, when executed, cause at least one processor of a computing device to: while the computing device is in a limited-access state, output, for display, a user interface element; responsive to receiving an indication of a first user input at a region of a presence-sensitive input device that corresponds to at least a portion of the user interface element as displayed, alter the visual appearance of the user interface element to indicate that the user interface element is selected; responsive to determining that the computing device has not received an indication of a second user input at the region of the presence-sensitive input device within a predefined period of time subsequent to receiving the indication of the first user input, alter the visual appearance of the user interface element so that the visual appearance of the user interface element is identical to the visual appearance of the user interface element prior to the selection of the user interface element; and responsive to determining that the computing device has received the indication of the second user input at the region of the presence-sensitive input device within the predefined period of time subsequent to receiving the indication of the first user input, perform, by the computing device, the action associated with the user interface element.

In another aspect, the disclosure is directed to a computing system. The computing system may include at least one processor. The computing system may also include a presence-sensitive input device. The computing system may also include at least one module operable by the at least one processor to: while the computing system is in a limited-access state, output for display a user interface element; responsive to receiving an indication, by the computing system, of a first user input at a region of the presence-sensitive input device that corresponds to at least a portion of the user interface element as displayed, alter the visual appearance of the user interface element to indicate that the user interface element is selected; responsive to determining that the computing system has not received an indication of a second user input at the region of the presence-sensitive input device within a predefined period of time subsequent to receiving the indication of the first user input, alter the visual appearance of the user interface element to indicate that the user interface element is deselected; and responsive to determining that the computing system has received the indication of the second user input at the region of the presence-sensitive input device within the predefined period of time subsequent to receiving the indication of the first user input, perform an action associated with the user interface element.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
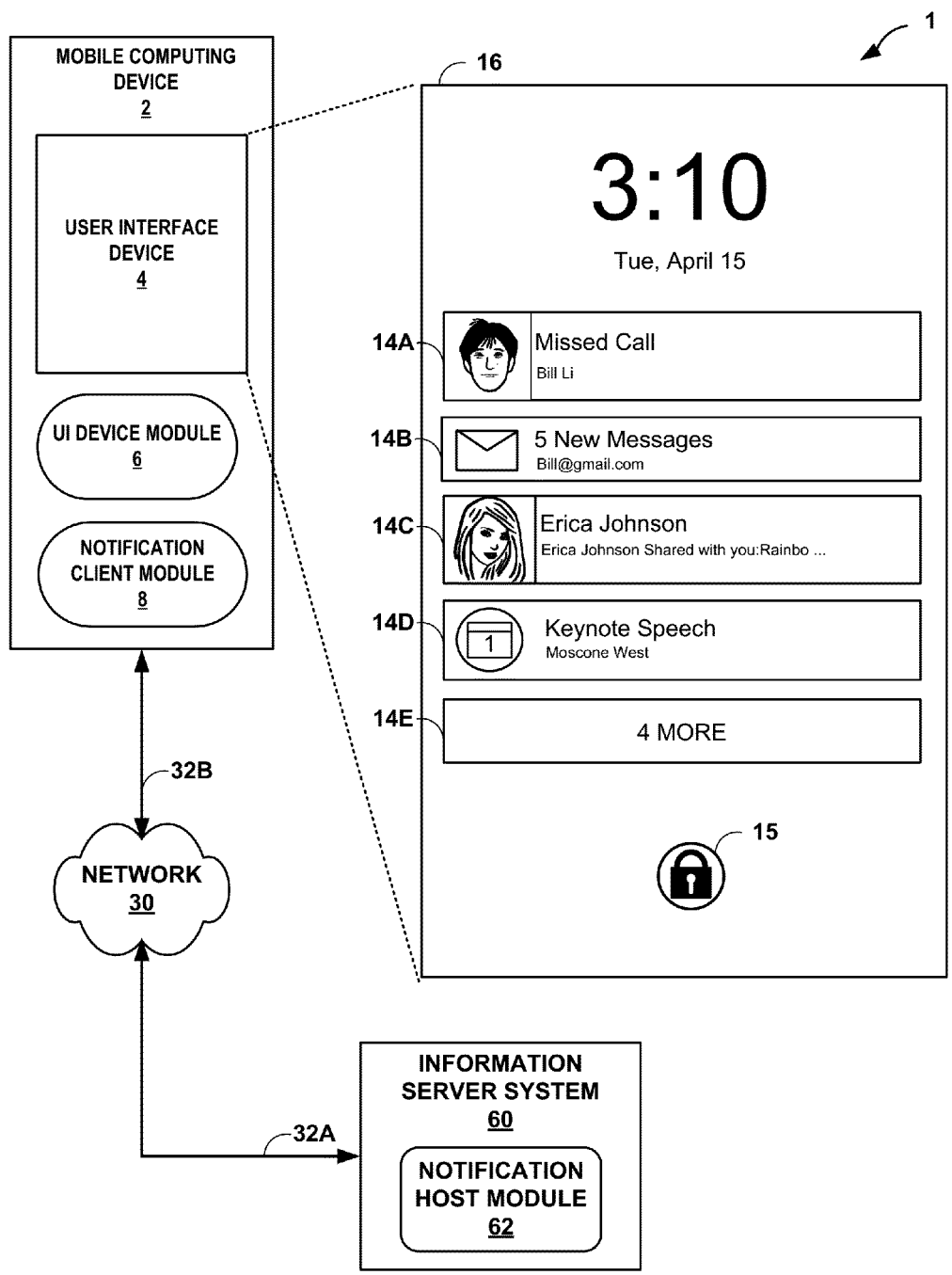
FIG. 1 is a conceptual diagram illustrating an example computing system configured to prevent inadvertent user activation of user interface elements in accordance with one or more aspects of the present disclosure.

In general, aspects of the present disclosure are directed to techniques for preventing unintentional user activation of user interface elements. In a limited access state, a presence-sensitive display of a computing device may output user interface elements including information that may be easily glanceable by the user of the computing device without requiring the user to provide specific input to unlock the computing device. The user interface elements may be outputted by the presence-sensitive display such that if the user wishes to cause the computing device to perform an action associated with the user interface element outputted by the computing device, the user may provide user input at the presence-sensitive display to select and thereby activate the user interface element to cause the computing device to perform an action associated with the user interface element.

In accordance with techniques of the disclosure, to prevent unintentional activation of a user interface element that is outputted by the computing device for display at a presence-sensitive display, the computing device may not perform an action associated with a particular user interface element until the computing device receives indications of two consecutive tap gestures within a region of the presence-sensitive display that corresponds to the user interface element within a predefined time period. Furthermore, if the computing device receives an indication of a first tap gesture within a region of the presence-sensitive display that corresponds to the user interface element but does not receive a second tap gesture within a region of the presence-sensitive display that corresponds to the user interface element within a predefined time period after receiving the first tap gesture, or if the computing device receives a first tap gesture within a region of the presence-sensitive display that corresponds to the user interface element but subsequently receives a second tap gesture outside of the region of the presence-sensitive display that corresponds to the user interface element, the computing device may also not activate the user interface element. In this way, the computing device may prevent unintentional activation of a user interface element while retaining flexibility in how the user interface element is presented in the user interface.

As one example, while a computing device is in a limited-access state, the computing device may output for display a user interface element. Responsive to receiving an indication of a first user input at a region of a presence-sensitive input device that corresponds to at least a portion of the user interface element as displayed, the computing device may alter a visual appearance of the user interface element to indicate that the user interface element is selected. Responsive to determining that the computing device has not received an indication of a second user input at the region of the presence-sensitive input device within a predefined period of time subsequent to receiving the indication of the first user input, the computing device may alter the visual appearance of the user interface element to indicate that the user interface element is deselected. Responsive to determining that the computing device has received the indication of the second user input at the region of the presence-sensitive input device within the predefined period of time subsequent to receiving the indication of the first user input, the computing device may activate the user interface element.

In implementations of the disclosed technology in which a computing device or computing system collects personal information about users, and/or makes use of personal information, such users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a conceptual diagram illustrating an example computing system 1 configured to prevent inadvertent user activation of user interface elements in accordance with one or more aspects of the present disclosure. As shown in FIG. 1, network 30 represents any public or private communication network, for instance, a cellular, Wi-Fi, and/or other type of network for transmitting data between computing devices. Computing device 2 and information server system 60 may send and receive data across network 30 using any suitable communication techniques. For example, computing device 2 may be operatively coupled to network 30 using network link 32A. Information server system 60 may be operatively coupled to network 30 by network link 32B. Network 30 may include network hubs, network switches, network routers, etc., that are operatively inter-coupled thereby providing for the exchange of information between computing device 10 and information server system 60. In some examples, network links 32A and 32B may be Ethernet, ATM or other network connections. Such connections may be wireless and/or wired connections.

Information server system 60 represents any suitable remote computing system, such as one or more desktop computers, laptop computers, mainframes, servers, cloud computing systems, etc. capable of sending and receiving information across network link 32B to network 30. In some examples, information server system represents a host server for a notification system service. One or more computing devices, such as computing device 2, may access a notification service hosted by information server system 60 for transmitting and/or receiving notification data between platforms, applications, and services executing at the one or more computing devices. In some examples, information server system 60 represents a cloud computing system that provides notification services through network 30 to one or more computing devices, such as computing device 2, that access the notification services via access to the cloud provided by information server system 60.

In the example of FIG. 1, information server system 60 includes notification host module 62. Notification host module 62 may perform operations described using software, hardware, firmware, or a mixture of hardware, software, and firmware residing in and/or executing at information server system 60. Information server system 60 may execute notification host module 62 with multiple processors or multiple devices. Information server system 60 may execute notification host module 62 as a virtual machine executing on underlying hardware. Notification host module 62 may execute as a service of an operating system or computing platform. Notification host module 62 may execute as one or more executable programs at an application layer of a computing platform.

Notification host module 62 may perform functions for routing notification data between one or more computing devices, such as computing device 2, over network 30. For example, notification host module 62 may perform functions for hosting a notification service and outputting notification data associated with platforms, applications, and/or services executing at computing device 2. For example, notification host module 62 may receive notification data indicative of an event associated with an e-mail message account (e.g., a new message received) associated with computing device 2 and send the notification data across network 30 to computing device 2. Computing device 2 may receive the notification data from notification host module 62 of information server system 60 via network link 32B and provide an alert at computing device 2 to indicate the receipt of the notification data.

In some examples, computing device 2 may be associated with a user that may interact with the computing device by providing various user inputs into the computing device. Examples of computing device 2 may include, but are not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 2 may include stationary computing devices such as desktop computers, servers, mainframes, etc. Computing device 2, in some examples, may include user interface (UI) device 4, UI device module 6, and notification client module 8. Other examples of computing device 2 that implement techniques of this disclosure may include additional components not shown in FIG. 1.

Computing device 2 may include notification client module 8. Notification client module 8 may perform functions associated with receiving, managing, and otherwise handling at least a portion of the notification data generated and/or received by platforms, applications, and services executing at computing device 2. Notification module 10 may cause UI module 6 to output an alert (e.g., an audible alert, a visual alert, a vibration, etc.) to indicate the receipt or generation of the notification data by computing device 2. The alerts outputted by UI module 6 may include content such as text, graphics, audio, video, and the like that includes information indicative of notification data received by notification client module 8 that causes UI module 6 to output the associated alerts.

Notification client module 8 may receive notification data from information server system 60 and output the received notification data to a recipient platform, application, and/or service executing at computing device 2. Notification client module 8 may receive notification data generated by a platform, application, and/or service executing at computing device 2 and output the received notification data to information server system 60. Notification client module 8 may further receive notification data generated by one component of a platform, application, and/or service executing at computing device 2 and output the received notification data to a different component of a platform, application, and/or service executing at computing device 2.

As used throughout the disclosure, the term "notification data" is used to describe various types of information that may indicate the occurrence of an event associated with various platforms, applications, and services executing within an execution environment at one or more computing devices, such as computing device 2. For example, notification data may include, but is not limited to, information specifying an event such as: the receipt of a communication message (e.g., e-mail, instant message, SMS, etc.) by a messaging account associated with a computing device, the receipt of information by a social networking account associated with computing device 2, a reminder of a calendar event (meetings, appointments, etc.) associated with a calendar account of computer device 2, information generated and/or received by a third-party application executing at computing device 2, the transmittal and/or receipt of inter-component communications between two or more components of platforms, applications, and/or services executing at computing device 2, etc.

In addition to including information about a specific event, such as the various events described above, notification data may include various attributes or parameters embedded within the notification data that specify various characteristics of the notification data. For example the notification data may include a portion of data (e.g., a bit, metadata, a field, etc.) that specifies the origin of the notification data (e.g., the platform, application, and/or service that generated the notification data).

Notification client module 8 may be implemented in various ways. For example, notification client module 8 may be implemented as a downloadable or pre-installed application or "app." In another example, notification client module 8 may be implemented as part of a hardware unit of computing device 2. In another example, notification client module 8 may be implemented as part of an operating system of computing device 2. In some instances, portions of the functionality of notification client module 8 or any other module described in this disclosure may be implemented across any combination of an application, hardware unit, and operating system.

In some examples, if computing device 2 is a wearable computing device, such as a smart watch, computing device 2 may act as a companion device to an external computing device (not shown), such as a smart phone. In this example, the external computing device may communicate with computing device 2 to send notification data to computing device 2. For example, in response to receiving a text message, the external computing device may communicate a notification data associated with the text message to computing device 2 to cause UID module 6 to output one or more of alerts associated with the notification data. The external computing device may communicate to computing device 2 information that UID module 6 may include in the one or more of the alerts, such as the type of alert, the sender of the text message, and the like.

As shown in FIG. 1, computing device 2 may include UI device module 6. UI device module 6 may cause UID 4 to output user interface 16 or another example user interface, for display and, as a user of computing device 2 interacts with user interface presented at UID 4, UI device module 6 may interpret inputs detected at UID 4 (e.g., as a user provides one or more gestures at a location of UID 4 at which user interface 16 or another example user interface is displayed). UI device module 6 may relay information about the inputs detected at UID 4 to one or more associated platforms, operating systems, applications, and/or services executing at computing device 2 to cause computing device 10 to perform a function.

UI device module 6 may also receive information and instructions from one or more associated platforms, operating systems, applications, and/or services executing at computing device 2 (e.g., notification client module 8) for generating user interface 16. In addition, UI module 20 may act as an intermediary between the one or more associated platforms, operating systems, applications, and/or services executing at computing device 2 and various output devices of computing device 2 (e.g., speakers, LED indicators, vibrators, etc.) to produce output (e.g., graphical, audible, tactile, etc.) with computing device 2. In the example of FIG. 1, UI device 4 may be a presence-sensitive display that may display a graphical user interface and receive input using capacitive, inductive, and/or optical detection at or near the presence-sensitive display.

For instance, user interface 16 is one example graphical user interface for presenting one or more user interface elements that are graphical indications of notification data received by computing device 2. User interface 16 includes user interface elements 14A-14E (collectively referred to herein as "user interface elements 14"). One or more of user interface elements 14 may correspond to one or more alerts being outputted by computing device 2 in response to notification data received at or generated by computing device 2. User interface element 14A may represent a visual alert indicative of the receipt of notification data associated with a missed voice call. User interface element 14B may represent a visual alert indicative of the receipt of notification data associated with one or more messages, such as e-mail messages, text messages, multimedia messages, instant messages, and the like. User interface element 14C may represent a visual alert indicative of the receipt of notification data associated with a social media network. User interface element 14D may represent a visual alert indicative of the receipt of notification data associated with a calendar event. User interface element 14E may represent a visual alert indicative of additional notification data events.

UI device module 6 may receive, as input from notification client module 8, graphical information (e.g., text data, images data, etc.) based on the notification data that notification client module 8 receives. Additionally, UI device module 6 may receive instructions associated with the graphical information from notification client module 8 for presenting the graphical information as one of user interface elements 14 within user interface 16. Based on the graphical information and the instructions received from notification client module 8, UI device module 6 may cause UID 4 to present user interface elements 14 within user interface 16 to alert a user of computing device 2 of the receipt of notification data associated with each of user interface elements 14.

UI device module 6 may be implemented in various ways. For example, UI device module 6 may be implemented as a downloadable or pre-installed application or "app." In another example, UI device module 6 may be implemented as part of a hardware unit of computing device 2. In another example, UI device module 6 may be implemented as part of an operating system of computing device 2. In some instances, portions of the functionality of UI device module 6 or any other module described in this disclosure may be implemented across any combination of an application, hardware unit, and operating system. To prevent unintentional user activation of a user interface element that is outputted by the computing device for display at a presence-sensitive display device, the computing device may activate a user interface element upon the user performing a drag gesture within a region of the presence-sensitive display that corresponds to the user interface element from substantially one edge of the presence-sensitive display device to substantially an opposing edge of the presence-sensitive display device. While such an edge-to-edge drag gesture may potentially be useful for activating a user interface element having a corresponding region as displayed at the presence-sensitive display device that spans from one edge of the presence-sensitive display device to an opposing edge of the presence-sensitive display, supporting such an edge-to-edge drag gesture may potentially also limit the computing device's flexibility in outputting user interface elements in different sizes at different locations of the presence-sensitive display device. For example, the computing device may be limited to outputting user interface elements in particular sizes at particular locations of the presence-sensitive display device that are convenient for the user to perform edge-to-edge drag gestures within the regions of the presence-sensitive display that corresponds to those user interface elements.

Conversely, the computing device may enable the user to activate a user interface element by performing a tap gesture within a region of the presence-sensitive display that corresponds to the user interface element. While enabling a tap gesture to activate a user interface element may increase the computing device's flexibility in outputting user interface elements in different sizes at different locations of the presence-sensitive display device, it may also increase the number of unintentional user activation of the user interface elements because unintentional contact with the presence-sensitive display of the computing device may potentially be more readily interpreted by the computing device as a tap gesture than, for example, an edge-to-edge drag gesture.

In operation, in the example shown in FIG. 1, computing device 2 may be in a limited access state to prevent UID 4 from receiving an inadvertent or unintended indication of a user input that causes computing device 2 to perform a particular functionality, such as launching an application or placing an outgoing phone call. For example, accidental touches of the presence-sensitive display of computing device 2 may occur if computing device 2 is placed in the user's pocket or purse. While a computing device is in the limited-access state, the computing device may output for display a user interface element. The user interface element may have a visual appearance which indicates that the user interface element is not activated. For example, notification client module 8 may receive notification data specifying that a voice phone call was missed by computing device 2, notification data specifying that one or more messages was received by one or more message accounts (e.g., an e-mail account) associated with computing device 2, notification data specifying that one or more social media network messages was received by one or more social media network accounts associated with computing device 2, notification data specifying an upcoming calendar event, and the like. Notification client module 8 may communicate the received notification data along with associated instructions to UI device module 6. UI device module 6 may, based on the received notification data and associated instructions, present user interface elements 14 within user interface 16 to alert a user of computing device 2 of the receipt of notification data associated with each of user interface elements 14.

A user may interact with each of graphical notifications 14 to cause user interface 16 to present additional information associated with the notification data. For example, the user may interact with user interface element 14D associated with notification data specifying an upcoming calendar event to cause user interface 16 to present additional information associated with the calendar event, such as the date of the calendar event, the time of the calendar event, the location of the calendar event, and the like. If user interface 16 includes a presence-sensitive display, the user may interact with user interface element 14D by tapping, dragging, or performing any other suitable touch gesture at the region of the presence-sensitive display that corresponds to user interface element 14D.

Prior to receiving an indication of a user input at a region of a presence-sensitive input device that corresponds to at least a portion of the user interface element as displayed, such as an indication of a user input at a region of the presence-sensitive input device that corresponds to at least a portion of user interface element 14D as displayed, user interface element 14D may have a visual appearance which indicates that user interface element 14D is not activated or is not selected.

Having a visual appearance which indicates it is not activated or is not selected may include user interface element 14D appearing to have a similar visual appearance as the other user interface elements 14A, 14B, 14C, and 14E. For example, user interface element 14D may have a similar size, a similar foreground and/or background color, a similar opacity/translucency, a similar darkness, a similar visual style, a similar icon style, a similar font size and/or font style, and the like compared to the other user interface elements 14A, 14B, 14C, and 14E. By having a similar visual appearance to other user interface elements, the visual appearance of a user interface element may visually indicate to the user that a user interface element, such as user interface element 14D, is in the same state as the other user interface elements 14A, 14B, 14C, and 14E. Note that while each of user interface elements 14 representing visual alerts that are indicative of the receipt of notification data may have a similar visual appearance, the visual appearance of user interface elements 14 may be different from the visual appearance of other user interface elements in user interface 16 that are not indicative of the receipt of notification data, such as lock element 15.

Responsive to receiving an indication of a first user input at a region of a presence-sensitive input device that corresponds to at least a portion of the user interface element as displayed, the computing device may alter the visual appearance of the user interface element to indicate that the user interface element is selected. For example, upon the computing device receiving an indication of a user input at a region of the presence-sensitive display that corresponds to at least a portion of user interface element 14D as displayed at the presence-sensitive display, the computing device 14D may alter the visual appearance of user interface element 14D as it appears in user interface 16. For example, user interface element 14D may have a different size, a different visual style, a different foreground and/or background color, a different opacity/translucency, a different icon style, a different font size and/or font style, and the like compared to the other user interface elements 14A, 14B, 14C, and 14E. By having a different visual appearance to other user interface elements, the visual appearance of a user interface element may visually indicate to the user that a user interface element, such as user interface element 14D, is in a different state as compared to the other user interface elements 14A, 14B, 14C, and 14E. Furthermore, the different visual appearance of user interface element 14D in the selected state may visually indicate to the user that the user may once again provide user input at the region of the presence-sensitive display that corresponds to user interface element 14D to activate user interface element 14D and correspondingly cause computing device 2 to perform an action associated with user interface element 14D.

In other words, as discussed above, if the user selects a particular user interface element, such as user interface element 14D, the selected user interface element 14D may transition from an unselected state to a selected state. Accordingly, the computing device may alter the visual appearance of the user interface element to indicate to the user that the user has selected user interface element 14D and to indicate that user interface element 14D may be selectable again by the user to cause computing device 2 to perform an action associated with user interface element 14D.

Responsive to determining that the computing device has not received an indication of a second user input at the region of the presence-sensitive input device within a predefined period of time subsequent to receiving the indication of the first user input, the computing device may alter the visual appearance of the user interface element to indicate that the user interface element is deselected. Altering the visual appearance of the user interface element to indicate that the user interface is deselected may include altering the visual appearance of the user interface element so that the visual appearance is the same as the visual appearance of the user interface element prior to the selection of the user interface element In other words, to minimize unintentional inputs of the user from being able to cause computing device 2 to perform an action associated with the selected user interface element, such as user interface element 14D, computing device 2 may not perform the action associated with the selected user interface element 14D in response to receiving an indication of a first user input within the region of the presence-sensitive display that corresponds to user interface element 14D that causes the user interface to transition from an unselected state to a selected state until computing device 2, while user interface element 14D is in the selected state, receives an indication of a second user input within the region of the presence-sensitive display that corresponds to user interface element 14D that is within a predefined period of time subsequent to receiving the indication of the first user input within the region of the presence-sensitive display that corresponds to user interface element 14D. If computing device 2 does not receive an indication of a second user input within the region of the presence-sensitive display that corresponds to user interface element 14D that is within a predefined period of time subsequent to receiving the indication of the first user input within the region of the presence-sensitive display that corresponds to user interface element 14D, computing device 2 may transition user interface element 14D from a selected state back to an unselected state and may alter the visual appearance of user interface element 14D so that it once again visually appears to be similar to the visual appearance of the other user interface elements 14A, 14B, 14C, and 14E.

The predefined period of time subsequent to receiving the indication of the first user input may set a time limit for a user interface element, such as user interface element 14D to remain in a selected state, thereby limiting the time available for an unintentional user input to be interpreted as an indication of a second user input that activates user interface 14D when user interface 14D is in the selected state causes computing device 2 to perform the action associated with user interface element 14D. Furthermore, if the presence-sensitive display receives an indication of user input outside of the region corresponding to user interface element 14D prior to the presence-sensitive display receiving an indication of a second user input at the region of the presence-sensitive input device, the computing device may also transition user interface element 14D from a selected state back to an unselected state and may alter the visual appearance of user interface element 14D so that it once again visually appears to be similar to the visual appearance of the other user interface elements 14A, 14B, 14C, and 14E.

As such, if the user selects a particular user interface element, such as user interface element 14D such that the selected user interface element 14D transitions from an unselected state to a selected state, the selected user interface element 14D may transition back form the selected state to the unselected state if the user does not again select the selected user interface element 14D within a defined time interval after the user first selects user interface element 14D. Furthermore, during the time interval, if the user selects one of the other user interface elements 14A, 14B, 14C, and 14E or if the user selects any other region of the presence-sensitive display that does not correspond with user interface element 14D, the user selection may also cause user interface element 14D to transition from the selected state to the unselected state. In this way, the computing device 2 may also minimize the possibility of an unintended input from causing computing device 2 to perform the action associated with user interface element 14.

Responsive to determining that the computing device has received the indication of the second user input at the region of the presence-sensitive input device within the predefined period of time subsequent to receiving the indication of the first user input, the computing device may activate the user interface element. Activating the user interface element may include performing the action associated with the user interface element.

As such, if the user selects a particular user interface element, such as user interface element 14D such that the selected user interface element 14D transitions from an unselected state to a selected state, and if the user subsequently selects the selected user interface element 14D within the defined time interval after the user first selects user interface 14D without any intervening user selection of any other region of the presence-sensitive display that does not correspond with user interface element 14D, the subsequent user selection of user interface element 14D may cause computing device 2 to activate user interface element 14D, including performing the action associated with user interface element 14.

Figure 2:
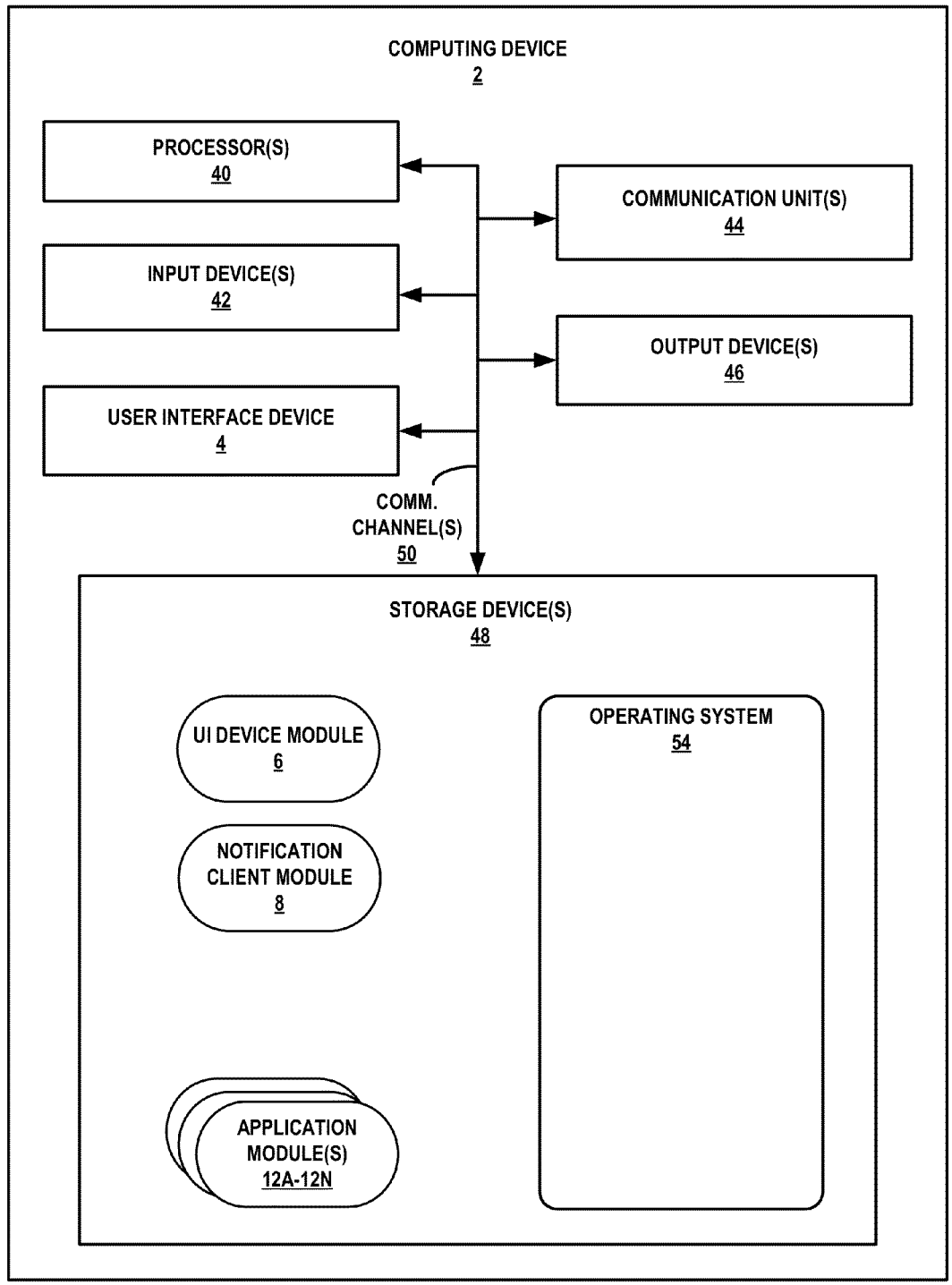
FIG. 2 is a block diagram illustrating an example computing device configured to prevent inadvertent user activation of user interface elements in accordance with one or more aspects of the present disclosure.

FIG. 2 is a block diagram illustrating an example computing device configured to prevent inadvertent user activation of user interface elements in accordance with one or more aspects of the present disclosure. Computing device 2 of FIG. 2 is described below within the context of computing device 2 of FIG. 1. FIG. 2 illustrates only one particular example of computing device 2 of system 1, and many other examples of computing device 2 may be used in other instances and may include a subset of the components included in example computing device 2 or may include additional components not shown in FIG. 2.

As shown in the example of FIG. 2, computing device 2 includes user interface device 4 ("UID 4"), one or more processors 40, one or more input devices 42, one or more communication units 44, one or more output devices 46, and one or more storage devices 48. Storage devices 48 of computing device 2 also include UI module 6, notification client module 8, application modules 12A-12N ("application modules 12"), and operating system 54. Communication channels 50 may interconnect each of the components 4, 6, 8, 12, 40, 42, 44, 46, 48, and 54 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, audio, and video input. Input devices 42 of computing device 2, in one example, includes a presence-sensitive display, touch-sensitive screen, mouse, keyboard, voice responsive system, video camera, microphone or any other type of device for detecting input from a human or machine.

One or more output devices 46 of computing device 2 may generate output. Examples of output are tactile, audio, and video output. Output devices 46 of computing device 2, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 2 may communicate with external devices via one or more networks by transmitting and/or receiving network signals on the one or more networks. For example, computing device 2 may use communication unit 44 to send and receive data to and from information server system 60 of FIG. 1. Computing device 2 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers.

In some examples, UID 4 of computing device 2 may include functionality of input devices 42 and/or output devices 46. In the example of FIG. 2, UID 4 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x, y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 4 presents a user interface (such as user interface 16 of FIG. 1).

While illustrated as an internal component of computing device 2, UID 4 also represents and external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

One or more storage devices 48 within computing device 2 may store information for processing during operation of computing device 2 (e.g., computing device 2 may store data accessed by modules 6, 8, and 12 during execution at computing device 2). In some examples, storage device 48 is a temporary memory, meaning that a primary purpose of storage device 48 is not long-term storage. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 6, 8, and 12.

One or more processors 40 may implement functionality and/or execute instructions within computing device 2. For example, processors 40 on computing device 2 may receive and execute instructions stored by storage devices 48 that execute the functionality of UI device module 6, notification client module 8, application modules 12, and operating system 54. These instructions executed by processors 40 may cause computing device 2 to store information, within storage devices 48 during program execution. Processors 40 may execute instructions of modules 6, 8, and 12 to cause UI device 4 to present GUI 16. That is, modules 6, 8, and 12 may be operable by processors 40 to perform various actions or functions of computing device 2 as described in this application.

Computing device 2 may be part of a mobile communications network. Computing device 2 may exchange data with a server or cloud computing system over the mobile communications network via one or more communication units 44. The server or cloud computing system may perform some or all of the techniques and operations related to modules 6, 8, and 12 described herein. In other words, some or all of the techniques and operations related to modules 6, 8, and 12 can be implemented locally at computing device 2, for instance, a mobile phone, and some or all of the techniques and operations may be performed remotely via a server connected to the mobile communications network that exchanges data with computing device 2. In other words, while shown in FIG. 2 as being included within computing device 2, modules 6, 8, and 12 may be a part of a remote computing system and may execute as one or more remote computing services, such as one or more services provided by a cloud and/or cluster based computing system.

Operating system 54 may execute to cause computing device 2 to perform various functions to manage hardware resources of computing device 2 and to provide various common services for other computer programs. Application modules 12 may cause computing device 10 to provide various applications (e.g., "apps").

In some examples, operating system 54 may execute to cause computing device 2 to be in a limited access state to prevent UID 4 from receiving an inadvertent or unintended indication of a user input that causes computing device 2 to perform a particular functionality, such as executing one or more of application modules 12. Computing device 2 may be in a limited state, for example, upon UID 4 being turned on in response to computing device 2 transitioning from a sleep state to a wake state. In conjunction to computing device 2 being in a limited access state, UID module 6 may output for display at UID 4 a lock screen interface. As such, a lock screen interface in the limited access state may, for example, prevent unintended selection of user interface elements in the lock screen interface and may also limit unauthorized access to at least some functionality of computing device 2.

The lock screen interface displayed at UID 4 may include one or more user interface elements (e.g., widgets, UI controls, and the like) that visually indicate notification data received by notification client module 8. The one or more user interface elements may include data (e.g., text, images, and the like) included in the associated notification data. The user may interact with a user interface element by tapping, dragging, or performing any other suitable touch gesture at the region of UID 4 that corresponds to the particular user interface element. These user interface elements may, prior to being selected via user input, be unselected user interface elements.

Responsive to receiving an indication of a first user input at a region of UID 4 that corresponds to at least a portion of the unselected user interface element as displayed, computing device 2 may select the particular user interface element and alter its visual appearance of the user interface element to indicate that the user interface element is selected. As such, the particular user interface element may transition from being an unselected user interface element to a selected user interface element.

Responsive to determining that UID module 6 has not received an indication of a second user input at the region that corresponds to at least a portion of the selected user interface element as displayed within a predefined period of time subsequent to receiving the indication of the first user input, computing device 2 may deselect the user interface element to prevent an inadvertent performing, by computing device 2, of an action associated with the user interface element while computing device 2 is in the limited-access state and may alter the visual appearance of the user interface element to indicate that the user interface element is deselected.

In some examples, the region of UID 4 that corresponds to at least a portion of the selected user interface element may be the same as the region of UID 4 that corresponds to at least a portion of the unselected user interface element prior to the selection of the unselected user interface element. In some other examples, the region of UID 4 that corresponds to at least a portion of the selected user interface element may be different from the region of UID 4 that corresponds to at least a portion of the unselected user interface element prior to the selection of the unselected user interface element. For example, the region of UID 4 that corresponds to at least a portion of the selected user interface element may be bigger than the region of UID 4 that corresponds to at least a portion of the unselected user interface element prior to the selection of the unselected user interface element.

Responsive to determining that UID module 6 has received the indication of the second user input at the region of UID 4 that corresponds to at least a portion of the selected user interface element within the predefined period of time subsequent to receiving the indication of the first user input, computing device 2 may perform the action associated with the user interface element. If computing device 2 is in a limited access state, the action associated with the user interface element may include exiting from the limited access state to a less limited access state. For example, UID module 6 may cause UID 4 to cease display of a lock screen interface. The action associated with the user interface element may also include computing device 2 launching and/or navigating to an application module of application modules 12 that is associated with the notification data that is associated with the user interface element. The application module associated with the notification data may, for example, output information associated with the notification, such as at least a portion of the content of the notification data.

Figure 3:
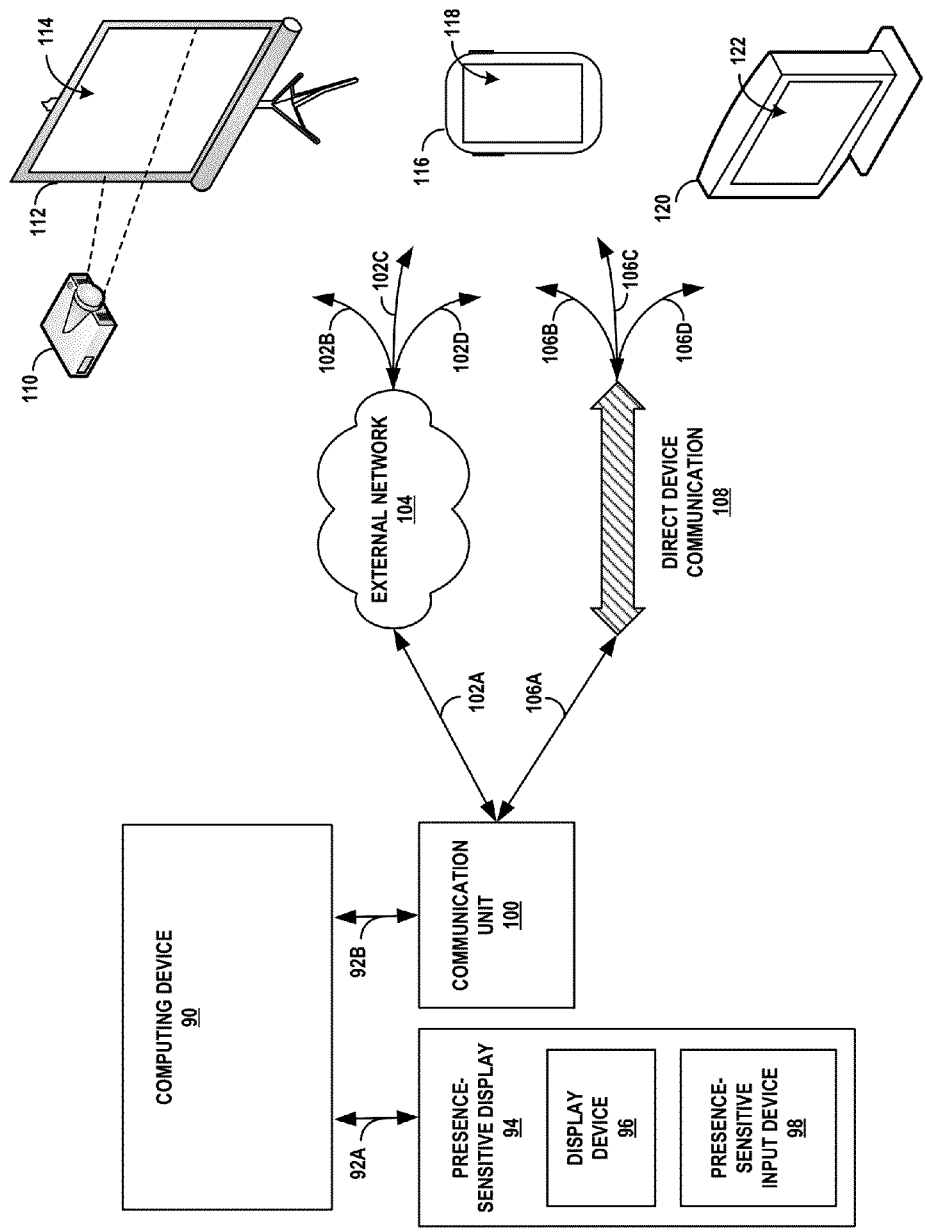
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 2, a computing device such as computing device 60 may, generally, be any component or system that includes a processor or other suitable computing environment for executing software instructions and, for example, need not include a presence-sensitive display.

As shown in the example of FIG. 3, computing device 90 may be a processor that includes functionality as described with respect to processor 40 in FIG. 2. In such examples, computing device 90 may be operatively coupled to presence-sensitive display 94 by a communication channel 92A, which may be a system bus or other suitable connection. Computing device 90 may also be operatively coupled to communication unit 100, further described below, by a communication channel 92B, which may also be a system bus or other suitable connection. Although shown separately as an example in FIG. 3, computing device 90 may be operatively coupled to presence-sensitive display 94 and communication unit 100 by any number of one or more communication channels.

In other examples, such as illustrated previously by computing device 2 in FIGS. 1-2, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 94 may include display device 96 and presence-sensitive input device 98. Display device 96 may, for example, receive data from computing device 90 and display the graphical content. In some examples, presence-sensitive input device 98 may determine one or more inputs (e.g., continuous gestures, multi-touch gestures, single-touch gestures, etc.) at presence-sensitive display 94 using capacitive, inductive, and/or optical recognition techniques and send indications of such input to computing device 90 using communication channel 92A. In some examples, presence-sensitive input device 98 may be physically positioned on top of display device 96 such that, when a user positions an input unit over a graphical element displayed by display device 96, the location at which presence-sensitive input device 98 corresponds to the location of display device 96 at which the graphical element is displayed. In other examples, presence-sensitive input device 98 may be positioned physically apart from display device 96, and locations of presence-sensitive input device 98 may correspond to locations of display device 96, such that input can be made at presence-sensitive input device 98 for interacting with graphical elements displayed at corresponding locations of display device 96.

As shown in FIG. 3, computing device 90 may also include and/or be operatively coupled with communication unit 100. Communication unit 100 may include functionality of communication unit 44 as described in FIG. 2. Examples of communication unit 100 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 90 may also include and/or be operatively coupled with one or more other devices, e.g., input devices, output devices, memory, storage devices, etc. that are not shown in FIG. 3 for purposes of brevity and illustration.

FIG. 3 also illustrates a projector 110 and projector screen 112. Other such examples of projection devices may include electronic whiteboards, holographic display devices, and any other suitable devices for displaying graphical content. Projector 110 and projector screen 112 may include one or more communication units that enable the respective devices to communicate with computing device 90. In some examples, the one or more communication units may enable communication between projector 110 and projector screen 112. Projector 110 may receive data from computing device 90 that includes graphical content. Projector 110, in response to receiving the data, may project the graphical content onto projector screen 112. In some examples, projector 110 may determine one or more inputs (e.g., continuous gestures, multi-touch gestures, single-touch gestures, etc.) at projector screen 112 using optical recognition or other suitable techniques and send indications of such input using one or more communication units to computing device 90. In such examples, projector screen 112 may be unnecessary, and projector 110 may project graphical content on any suitable medium and detect one or more user inputs using optical recognition or other such suitable techniques.

Projector screen 112, in some examples, may include a presence-sensitive display 114. Presence-sensitive display 114 may include a subset of functionality or all of the functionality of UI device 4 as described in this disclosure. In some examples, presence-sensitive display 114 may include additional functionality. Projector screen 112 (e.g., an electronic display of computing eye glasses) may receive data from computing device 90 and display the graphical content. In some examples, presence-sensitive display 114 may determine one or more inputs (e.g., continuous gestures, multi-touch gestures, single-touch gestures, etc.) at projector screen 112 using capacitive, inductive, and/or optical recognition techniques and send indications of such input using one or more communication units to computing device 90.

FIG. 3 also illustrates mobile device 116 and visual display device 120. Mobile device 116 and visual display device 120 may each include computing and connectivity capabilities. Examples of mobile device 116 may include e-reader devices, convertible notebook devices, hybrid slate devices, computerized watches, computerized eyeglasses, etc. Examples of visual display device 120 may include other semi-stationary devices such as televisions, computer monitors, etc. As shown in FIG. 3, mobile device 116 may include a presence-sensitive display 118. Visual display device 120 may include a presence-sensitive display 122. Presence-sensitive displays 118 and 122 may include a subset of functionality or all of the functionality of UID 4 as described in this disclosure. In some examples, presence-sensitive displays 118 and 122 may include additional functionality. In any case, presence-sensitive display 122, for example, may receive data from computing device 90 and display the graphical content. In some examples, presence-sensitive display 112 may determine one or more inputs (e.g., continuous gestures, multi-touch gestures, single-touch gestures, etc.) at projector screen using capacitive, inductive, and/or optical recognition techniques and send indications of such input using one or more communication units to computing device 90.

As described above, in some examples, computing device 90 may output graphical content for display at presence-sensitive display 94 that is coupled to computing device 90 by a system bus or other suitable communication channel. Computing device 90 may also output graphical content for display at one or more remote devices, such as projector 110, projector screen 112, mobile device 116, and visual display device 120. For instance, computing device 90 may execute one or more instructions to generate and/or modify graphical content in accordance with techniques of the present disclosure. Computing device 90 may output the data that includes the graphical content to a communication unit of computing device 90, such as communication unit 100. Communication unit 100 may send the data to one or more of the remote devices, such as projector 110, projector screen 112, mobile device 116, and/or visual display device 120. In this way, computing device 90 may output the graphical content for display at one or more of the remote devices. In some examples, one or more of the remote devices may output the graphical content at a presence-sensitive display that is included in and/or operatively coupled to the respective remote devices.

In some examples, computing device 90 may not output graphical content at presence-sensitive display 94 that is operatively coupled to computing device 90. In other examples, computing device 90 may output graphical content for display at both a presence-sensitive display 94 that is coupled to computing device 90 by communication channel 92A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 90 and output for display at presence-sensitive display 94 may be different than graphical content display output for display at one or more remote devices.

Computing device 90 may send and receive data using any suitable communication techniques. For example, computing device 90 may be operatively coupled to external network 104 using network link 102A. Each of the remote devices illustrated in FIG. 3 may be operatively coupled to network external network 104 by one of respective network links 108B, 108C, and 108D. External network 104 may include network hubs, network switches, network routers, etc., that are operatively inter-coupled thereby providing for the exchange of information between computing device 90 and the remote devices illustrated in FIG. 3. In some examples, network links 102A-102D may be Ethernet, ATM or other network connections. Such connections may be wireless and/or wired connections.

In some examples, computing device 90 may be operatively coupled to one or more of the remote devices included in FIG. 3 using direct device communication 108. Direct device communication 108 may include communications through which computing device 90 sends and receives data directly with a remote device, using wired or wireless communication. That is, in some examples of direct device communication 108, data sent by computing device 90 may not be forwarded by one or more additional devices before being received at the remote device, and vice-versa. Examples of direct device communication 108 may include Bluetooth, Near-Field Communication, Universal Serial Bus, Wi-Fi, infrared, etc. One or more of the remote devices illustrated in FIG. 3 may be operatively coupled with computing device 90 by communication links 106A-106D. In some examples, communication links 106A-106D may be connections using Bluetooth, Near-Field Communication, Universal Serial Bus, infrared, etc. Such connections may be wireless and/or wired connections.

In the example of FIG. 3, computing device 90 may output a GUI, such as GUI 16 illustrated in FIG. 1, for display by a display device (e.g., display device 96, presence-sensitive displays 114, 118, 122, etc.). For instance, computing device 90 may send data representing GUI 16 to communication unit 100. Communication unit 100 may send the data to visual display device 120 via external network 104. Visual display device 120 may cause presence-sensitive display 122 to output GUI 16.

In accordance with aspects of the present disclosure, while computing device 90 is in a limited-access state, computing device 90 may output for display at one or more remote devices, such as projector 110, projector screen 112, mobile device 116, and visual display device 120, GUI 16 that includes a user interface element having a visual appearance indicating that the user interface element is not activated. Responsive to receiving an indication of a first user input at a region of one or more of presence-sensitive input devices, such as one or more of presence-sensitive displays 114, 118, and 122, that corresponds to at least a portion of the user interface element as displayed, computing device 90 may select the user interface element and alter the visual appearance of the user interface element to indicate that the user interface element is selected. Responsive to determining that computing device 90 has not received an indication of a second user input at the region of one or more of presence-sensitive input devices, such as one or more of presence-sensitive displays 114, 118, and 122, within a predefined period of time subsequent to receiving the indication of the first user input, computing device 90 may deselect the user interface element to prevent an inadvertent performing, by computing device 90, of an action associated with the user interface element while the computing device is in the limited-access state and may alter the visual appearance of the user interface element to indicate that the user interface element is deselected. Responsive to determining that computing device 90 has received the indication of the second user input at the region of one or more of presence-sensitive input devices, such as one or more of presence-sensitive displays 114, 118, and 122, within the predefined period of time subsequent to receiving the indication of the first user input, computing device 90 may perform the action associated with the user interface element.

Figure 4B:
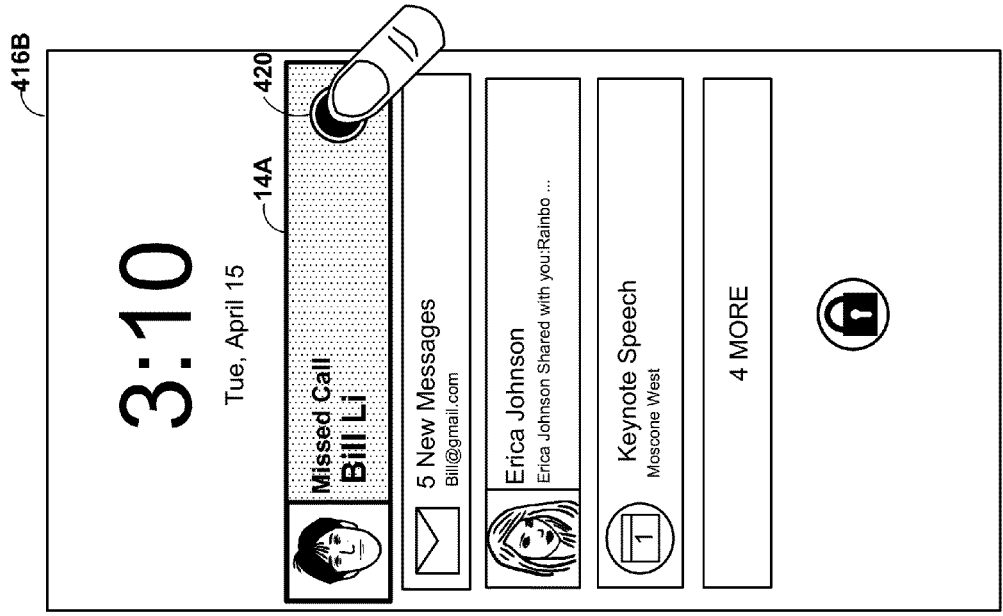
FIGS. 4A-4E are block diagrams illustrating techniques for preventing inadvertent user activation of user interface elements in accordance with one or more aspects of the present disclosure.
Figure 4A:
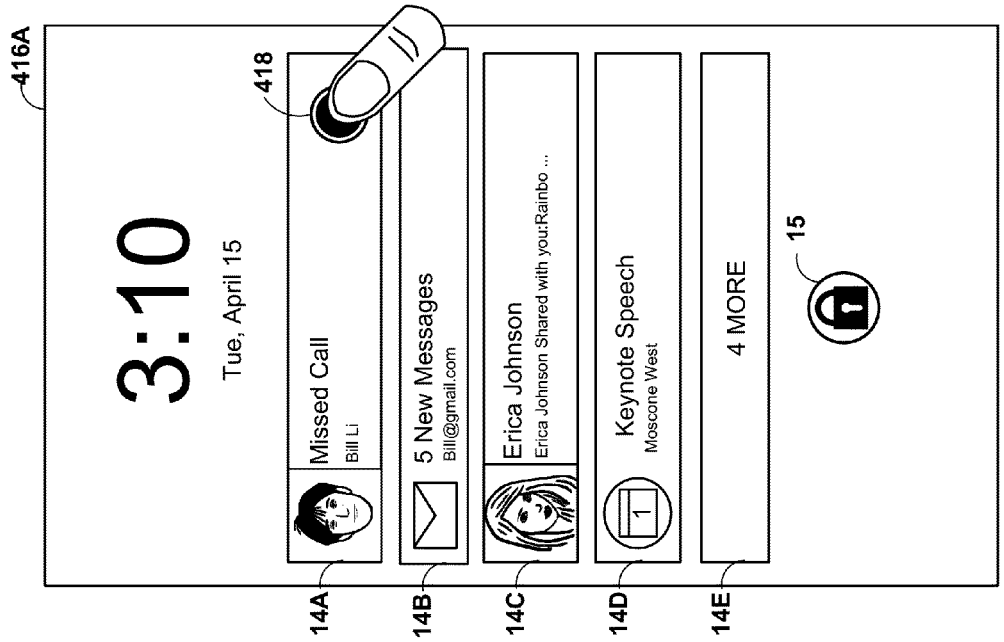

FIGS. 4A-4E are block diagrams illustrating techniques for preventing inadvertent user activation of user interface elements in accordance with one or more aspects of the present disclosure. FIGS. 4A-4E are described below within the context of computing device 2 of FIGS. 1 and 2. For example, computing device 2 may present user interfaces 416A and 416B as shown in the example of FIGS. 4A and 4B that are displayed by UID 4.

As shown in FIG. 4A, user interface elements 14 representing visual alerts that are indicative of the receipt of notification data may be included in user interface 414A. Each of user interface elements 14 in user interface 416A may have a visual appearance that indicates it has not been selected. While different user interface elements of user interface elements 14 may include different content (e.g., icons, text, and the like), each of user interface elements 14 may have a similar visual appearance. For example, each of user interface elements 14 may have a similar width, a similar thickness of borders, a similar font size and font style, a background having similar colors, opacity, and/or transparency, and the like, such that one of user interface elements 14 does not visually appear to be selected or otherwise highlighted compared to the other user interface elements of user interface elements 14. Note that while each of user interface elements 14 representing visual alerts that are indicative of the receipt of notification data may have a similar visual appearance, the visual appearance of user interface elements 14 may be different from the visual appearance of other user interface elements in user interface 416A that are not indicative of the receipt of notification data, such as lock element 15. Furthermore, while user interface elements 14 are described in this example as being visual alerts indicative of the receipt of notification data, the techniques described herein are not limited to visual alerts indicative of the receipt of notification data. For example, the techniques described herein may be equally applicable to any user interface elements displayed in a user interface, including user interface elements that are unrelated to notification data.

A user may select one of user interface elements 14 by providing user input (e.g., a tap gesture) within a region of UID 4 that corresponds to at least a portion of one of user interface elements 14 as displayed by UID 4. UI module 6 may receive an indication of the user input and may determine whether the indication of the user input corresponds to at least a portion of the user interface element as displayed by UID 4. In the example illustrated in FIG. 4A, the user may select user interface element 14A by providing user input 418 within a region of UID 4 that is within user interface element 14A as displayed by UID 4. UI module 6 may receive an indication of user input 418 and may determine whether the indication of user input 418 corresponds to at least a portion of user interface element 418 as displayed by UID 4. In some examples, user input 418 may be a tag gesture performed by the user at the region of UID 4 that corresponds to at least a portion of user interface element 14A as displayed by UID 4. In some other examples, user input 418 may be a drag gesture, such as a downward drag gesture with respect to the orientation of user interface 416A shown in FIG. 4A, performed by the user starting at the region of UID 4 that corresponds to at least a portion of user interface element 14A as displayed by UID 4. Alternatively, user input 418 may include any other suitable technique that may be used by the user to select user interface element 14A.

Responsive to UI module 6 determining that the indication of user input 418 corresponds to at least a portion of user interface element 14A as displayed by UID 4, computing device 2 may select user interface element 14A and UI module 6 may alter the visual appearance of user interface element 14A to indicate that user interface element 14A is selected. Thus, user interface element 14A may transition from an unselected state to a selected state in response to the user selecting user interface element 14A when user interface 14A is in the unselected state. As shown in FIG. 4B, because computing device 2 determines that user input 418 has selected user interface element 14A, UI module 6 may alter the visual appearance of user interface element 14A in UI 416B so that the visual appearance of user interface element 14A differs from its visual appearance prior to its selection via user input 418, and so that the visual appearance of user interface element 14A also differs from the visual appearance of user interface elements 14B, 14C, 14D, and 14E, thereby visually indicating that user interface element 14A is in a selected state while user interface elements 14B, 14C, 14D, and 14E are in an unselected state. For example, UI module 6 may alter the size of user interface element 14A, the thickness of user interface element 16's borders, the font size and/or font style of the text of user interface 14A, the background color, opacity, and/or transparency of user interface element 14A, and the like, to visually highlight user interface element 14A compared to user interface elements 14B, 14C, 14D, and 14E that were not selected in response to user input 418. In the example illustrated in FIG. 4B, UI module 6 alters the visual appearance of user interface element 14A by increasing its size, changing its background, increasing its border width, increasing the font size of its text, and bolding its text.

Although computing device 2 transitions user interface element 14A from an unselected state to a selected state upon receiving an indication of user input 418, computing device 2 may not perform certain actions associated with user interface element 14A until computing device 2 receives an indications of a second user input at a region of UID 4 that also corresponds to at least a portion of user interface element 14A as displayed at UID 4. In other words, computing device 2 may not perform certain actions associated with user interface element 14A until the user selects user interface element 14A two consecutive times. To decrease the possibility that an unintended user input from being determined by computing device to be a user input subsequent to user input 418 that enables computing device 2 to perform an action associated with user interface element 14A, computing device 2 may set a time window in which a subsequent indication of user input at a region of UID 4 that corresponds to at least a portion of user interface element 14A as displayed at UID 4 may enable computing device 2 to perform an action associated with user interface element 14A.

The time window may be any suitable predefined period of time that is longer than zero seconds and shorter than an infinite amount of time. For example, time window may be one second, three seconds, five seconds, and the like. Computing device 2 may start the time window having the predefined period of time immediately upon UI module 6 determining that an indication of user input, such as the indication of user input 418, corresponds to at least a portion of a user interface element, such as user interface element 14A, as displayed by UID 4.

Responsive to determining that computing device 2 has not received an indication of a second user input at the region of UID 4 that corresponds to at least a portion of user interface element 14A in the selected state as displayed by UID 4 within the predefined period of time subsequent to receiving the indication of user input 418, computing device 2 may transition user interface element 14A from the selected state back to the unselected state. In other words, if the user selects user interface element 14A, which starts the time window of a predefined period of time, but does not select user interface element 14A again prior to the end of the time window, user interface element 14A may revert from the selected state back to the unselected state.

As discussed above, because user interface element 14A in the selected state may visually appear to be different than user interface element 14A in the unselected state, user interface element 14A in the selected state, in some example, may visually appear to be of a different size (e.g., bigger) than user inter face element 14A in the unselected state. As such, the region of UID 4 that corresponds to at least a portion of user interface element 14A in the selected state as displayed by UID 4 may be the same or different than the region of UID 4 that corresponds to at least a portion of user interface element 14A in the unselected state as displayed by UID 4. For example, the region of UID 4 that corresponds to at least a portion of user interface element 14A in the selected state as displayed by UID 4 may larger than the region of UID 4 that corresponds to at least a portion of user interface element 14A in the unselected state as displayed by UID 4.

Computing device 2 transitioning user interface element 14A from the selected state back to the unselected state may include UI module 6 deselecting user interface element 14A to prevent computing device 2 inadvertent performing an action associated with user interface element 14A while computing device 2 is in the limited-access state. As such, if computing device 2 receives an indication of user input at the region of UID 4 that corresponds to at least a portion of user interface element 14A as displayed by UID 4 subsequent to computing device 2 transitioning user interface element 14A back to the unselected state, such a user input may be treated similarly to user input 418 and may instead simply cause computing device 2 to transition user interface element 14A from the unselected state to the selected state.

Computing device 2 transitioning user interface element 14A from the selected state back to the unselected state may also include UI module 6 altering the visual appearance of user interface element 14A to indicate that user interface element 14A is deselected, such that user interface element 14A may consequently visually appear as described with respect to user interface 416A shown in FIG. 4A so that user interface element 14A is no longer visually highlighted compared to other user interface elements 14B, 14C, 14D, and 14E. For example, computing device 2 may alter the visual appearance of user interface element 14A so that it may have a similar width, a similar thickness of borders, a similar font size and font style, a background having similar colors, opacity, and/or transparency, and the like as other user interface elements 14B, 14C, 14D, 14E. In other words, altering the visual appearance of user interface element 14A to indicate that user interface element 14A is deselected may include altering the visual appearance of user interface element 14A so that the visual appearance is the same as the visual appearance of user interface element 14A prior to the selection of user interface element 14A by user input 418.

Computing device 2 may, responsive to determining that it has received the indication of the second user input at the region of UID 4 that corresponds to at least a portion of user interface element 14A in the selected state as displayed by UID 4 within the predefined period of time subsequent to receiving the indication of the first user input, activate user interface element 14A. Activating user interface element 14A may include performing an action associated with user interface element 14A. In the example of FIG. 4B, while user interface element 14A is in the selected state during the time window of the predefined period of time, computing device 2 may receive an indication of user input 420, which may be subsequent to the indication of user input 420 received while user interface element 14A was in the unselected state. If computing device 2 determines that the indication of user input 420 is received at the region of UID 4 that corresponds to at least a portion of user interface element 14A in the selected state as displayed by UID 4, computing device may activate user interface element 14A, such as by performing an action associated with user interface element 14A.

In some examples, computing device 2 determining that it has received the indication of the second user input at the region of UID 4 that corresponds to at least a portion of user interface element 14A in the selected state as displayed by UID 4 within the predefined period of time subsequent to receiving the indication of the first user input may include determining that computing device 2 has not received an indication of a user input outside of the region of UID 4 that corresponds to at least a portion of user interface element 14A in the selected state as displayed by UID 4 prior to receiving the second user input at the region of UID 4 that corresponds to at least a portion of user interface element 14A in the selected state as displayed by UID 4 within the predefined period of time subsequent to receiving the indication of the first user input. As such, in the example of FIGS. 4A and 4B, computing device 2 may require that user inputs 418 and 420 be two consecutive user inputs at UID 4 without any intervening user inputs at UID 4. Thus, responsive to determining that computing device 2 has received an indication of a user input outside of the region of UID 4 corresponding to at least a portion of user interface 14A in the selected state subsequent to receiving the indication of user input 418, computing device 2 may transition user interface element 14A from the selected state back to the unselected state, including deselecting user interface element 14A and altering the visual appearance of user interface element 14A to indicate that user interface element 14A is deselected.

In some examples, to further prevent unintentional user activation of user interface elements, computing device 2 may not activate a user interface element upon a second consecutive indication of user input at a presence-sensitive display that selects the user interface element subsequent to a first indication of user input at the user interface display that selects the user interface element if the second user input is located on the presence-sensitive display more than a threshold distance away from the location of the first input on the presence-sensitive display. As such, computing device 2 determining that it has received an indication of user input 420 at the region of UID 4 corresponding to at least a portion of user interface 14A in the selected state as displayed by UID 4 subsequent to receiving the indication of user input 418 may also include computing device 2 determining whether user input 420 at the region of UID 4 corresponding to at least a portion of user interface 14A is also within a threshold distance on the presence-sensitive display from a location of the first user input on the presence-sensitive display. Examples of a threshold distance may include a certain number of pixels (e.g., 20 device-independent pixels), a certain physical distance (e.g., one inch), and the like.

Actions associated with a user interface element, such as user interface element 14A, that may be performed by computing device 2 may include outputting information regarding the alert associated with the user interface element, including information regarding the notification data indicated by the alert associated with the user interface element. In some examples, the action associated with the user interface element is not changing the appearance of the associated user interface element. In some examples, the action associated with the user interface element includes an action besides changing the appearance of the associated user interface element. The information may be more detailed than the information displayed within user interface element 14A such that it is additional to the information included in user interface 14A. For example, if a user interface element is a indicative of the receipt of notification data associated with one or more messages, the action that may be performed by computing device 2 may include outputting, for display at UID 4, at least a portion of the content of the one or more messages (e.g., at least a portion of the body of the one or more messages), including outputting content of the one or more messages that is not already included in the corresponding user interface element as displayed at UID 4. Outputting contents of the one or more messages that is additional to the data included in user interface element 14A may include, for example, launching, executing, outputting for display at UID 4, and/or navigating to one or more applications associated with user interface 14A, such as a messaging application associated with the one or more messages. In other examples, UID module 6 may output for display at UID 4 a card-based interface that includes the content of the one or more messages.

In another example, if a user interface element is indicative of the receipt of notification data associated with a calendar event, the action that may be perform by computing device 2 may include outputting, for display at UID 4, additional details related to the calendar event that is not already included in the corresponding user interface element as displayed at UID 4. For example, the additional details may include the location of the calendar event, the date and time of the calendar event, and the like.

In another example, if a user interface element is indicative of the receipt of notification data associated with a media file, such as an image file, a video file, or an audio file, the action that may be perform by computing device 2 may include outputting, for display at UID 4, the image file or the video file, or may include outputting the audio file at a speaker device operably coupled to computing device 2. For example, the user interface element may be indicative of an audio file, and the action that may be performed by computing device 2 may include playing the audio file, pausing the audio file, changing the output volume of the audio file, skipping to a next track in a playlist including the audio file, and the like.

Figure 4D:
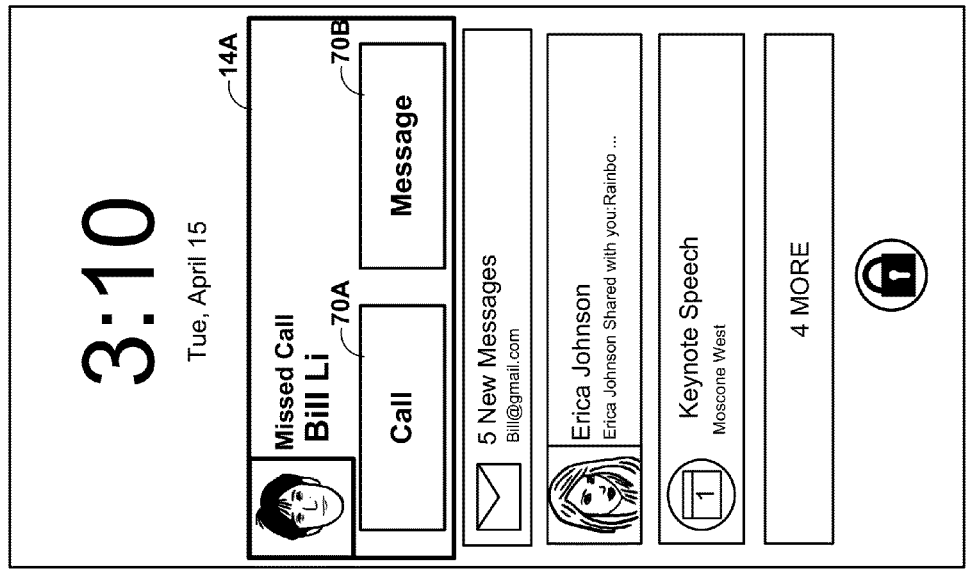
Figure 4C:
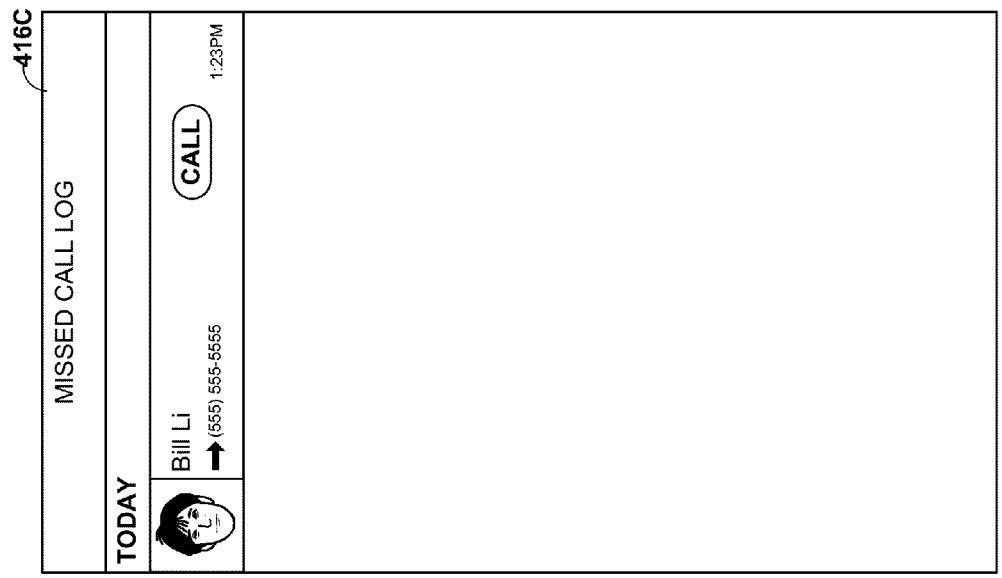

In the example shown in FIG. 4C, user interface element 14A may represent a visual alert indicative of the receipt of notification data associated with a missed voice call. As shown in FIG. 4C, actions related to user interface element 14A that may be performed by computing device 2 upon receiving the indication of user input 420 may include presenting additional details regarding the missed voice call, such as the time of the missed voice call, the phone number from which the missed voice call originated, a user interface button that the user may select to return the missed voice call, and the like. Those additional details regarding the missed voice call may, for example, be presented in a missed call log in user interface 416C.

As discussed above with respect to FIG. 4A, where user interface elements 14 are in in the unselected state, responsive to UI module 6 determining that the indication of user input 418 corresponds to at least a portion of user interface element 14A as displayed by UID 4, computing device 2 may select user interface element 14A and UI module 6 may alter the visual appearance of user interface element 14A to indicate that user interface element 14A is selected. Altering the visual appearance of a user interface element, such as user interface element 14A, may include outputting, by UI module 6 at UID 4, one or more additional user interface elements that are related to user interface element 14A. As shown in FIG. 4D, altering the visual appearance of user interface element 14A may include outputting user interface elements 70A and 70B in at least the region of UID 4 that corresponds to at least a portion of user interface element 14A as displayed by UID 4, such that user interface element 14A may include user interface elements 70A and 70B.

User interface elements 70A and 70B may, upon being selected by the user, perform actions associated with user interface element 14A. In the example shown in FIG. 4D, user interface element 70A may, upon being selected by the user, enable computing device 2 to place a voice call to the originator of the missed call that is being visually alerted by user interface element 14A. Similarly user interface element 70B may, upon being selected by the user, enable computing device 2 to transmit a message to the originator of the missed call that is being visually alerted by user interface element 14A. As such, computing device 2 determining that it has received the indication of the second user input at the region of UID 4 within the predefined period of time subsequent to receiving the indication of the first user input may include computing device 2 determining that it has received the indication of the second user input at a region of UID 4 that corresponds to at least a portion of user interface element 70A or user interface element 70B. In some other examples, if user interface element 14A is indicative of an audio file, such as a music file, user interface elements 70A and 70B may, for example, upon being selected by the user, enable computing device 2 to perform actions associated with the audio file, such as playing, pausing, or rating the audio file.

Figure 4E:
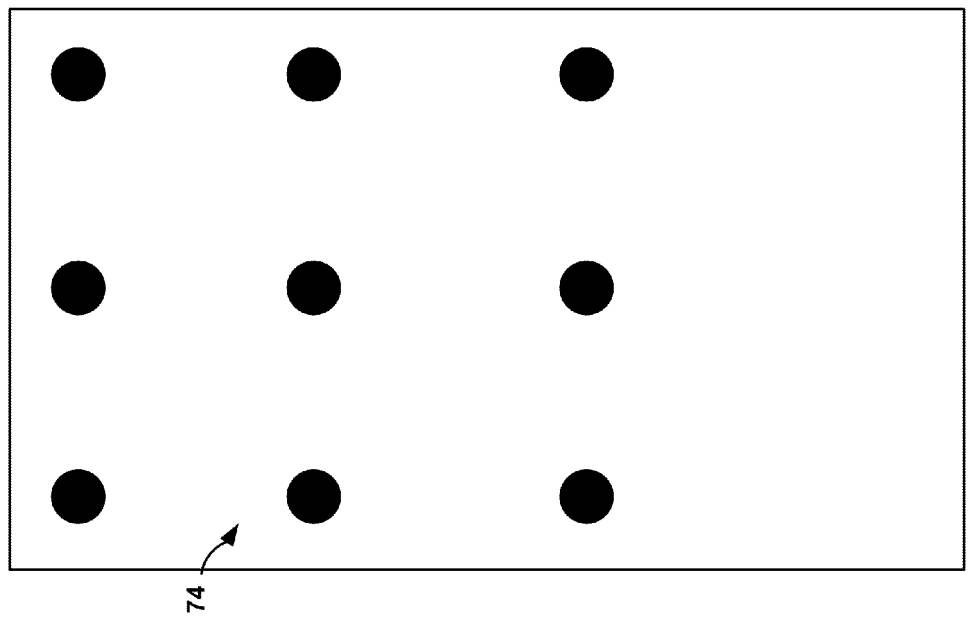

In some examples, activating user interface element 14A responsive to computing device 2 determining that it has received the indication of user input 420 at the region of UID 4 that corresponds to at least a portion of user interface element 14A in the selected state as displayed by UID 4 within the predefined period of time subsequent to receiving the indication of user input 418, computing device 2 may include execute an authentication process that may determine whether the user of computing device 2 is an authorized user of computing device 2 before computing device 2 may perform the action associated with user interface element 14A. UID 4 may receive an indication of a user input and computing device 2 may determine whether to authorize performance of an action associated with user interface element 14A based at least in part on authenticating the user input. As shown in FIG. 4E, UID module 6 may output for display at UID 4 an authentication interface, such as pattern lock interface 74, responsive to determining that it has received the indication of user input 420 at the region of UID 4 within the predefined period of time subsequent to receiving the indication of user input 418. The user may authenticate himself or herself as an authorized user of computing device 2 by inputting a gesture or other user input at UID 4 that is recognized by computing device 2 as the lock pattern of an authorized user of computing device 2. Computing device 2 may receive an indication of the user input and may authenticate the received user input to determine whether to authorize itself to perform an action associated with user interface element 14A based at least in part on the user input. Responsive to computing device 2 authenticating the user, computing device 2 may perform the action associated with user interface element 14A. Examples of authentication interfaces that may be outputted by computing device 2 to authenticate users of computing device 2 may include a password interface, a voice recognition interface, a fingerprint reader interface, a facial recognition interface, or any other suitable authentication interfaces for authenticating users of computing device 2. As such, user input that computing device 2 may authenticate to determine whether to authorize itself to perform an action may include voice input, fingerprint input, facial image input, and the like.

Figure 5A:
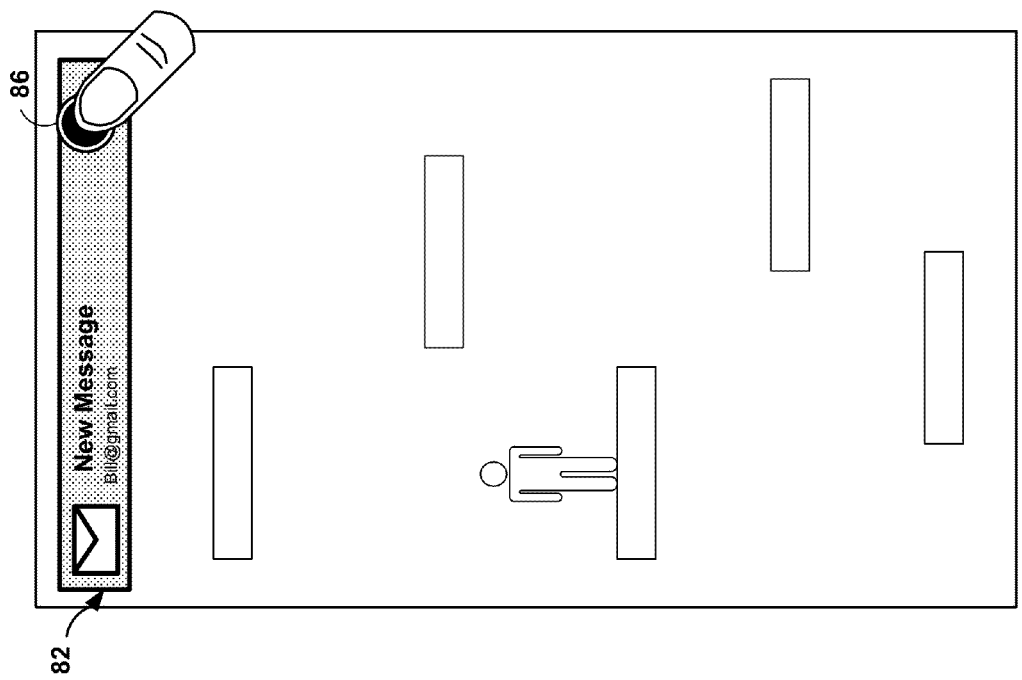
FIGS. 5A and 5B are block diagrams illustrating techniques for preventing unintentional user activation of user interface elements outside of a lock screen in accordance with one or more aspects of the present disclosure.
Figure 5B:
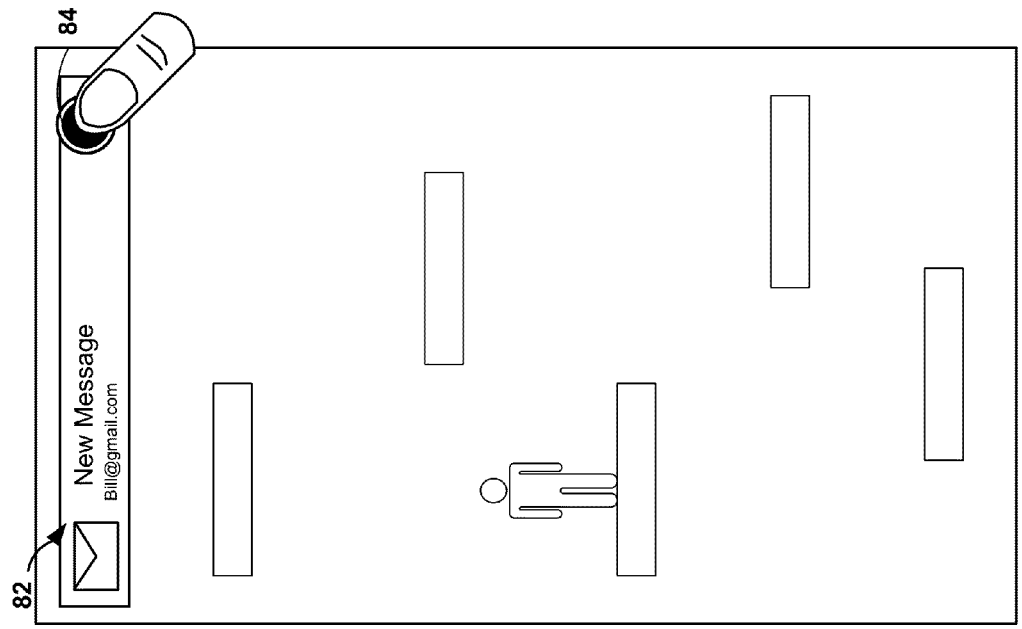

In some examples, computing device 2 may prevent unintentional user activation of user interface elements in contexts where computing device is not in a limited access state. For example, the techniques illustrated above may be useful to unintentional user activation of user interface elements in situations other than the lock screen. FIGS. 5A and 5B are block diagrams illustrating techniques for preventing unintentional user activation of user interface elements outside of a lock screen in accordance with one or more aspects of the present disclosure. As shown in FIG. 5A, computing device 2 may execute a gaming application where the user may interact with the gaming application via touch gestures (e.g., tap gestures, drag gestures, and the like). During execution of the gaming application, notification module 8 may receive notification data that is unrelated to gameplay of the gaming application and UID module 6 may output, at UID 4, user interface element 82 that represents a visual alert indicative of the receipt of notification data by notification module 8.

As the user interacts with the gaming application, there is a possibility that the user may unintentionally select user interface element 82 and thereby interrupt the user's gaming session. As such, the techniques discussed above with respect to FIGS. 4A-4E for activating user interface elements 14 may be applicable with respect to the scenario illustrated in FIGS. 5A and 5B to prevent the unintentional activation of user interface element 82. For example, while user interface element 82 is not selected and thus is in an unselected state, responsive to UID module 6 receiving an indication of user input 84 at a region of a UID 4 that corresponds to at least a portion of user interface element 82 as displayed, computing device 2 may select user interface element 82 and may alter the visual appearance of user interface element 82 to indicate that user interface element 82 is selected.

As shown in FIG. 5B, user interface element 82 is in a selected state upon to being selected by user input 84. While user interface element 82 is in the selected state, responsive to computing device 2 determining that it has not received an indication of a user input 86 at the region of the UID 4 within a predefined period of time subsequent to receiving the indication of user input 84, computing device 2 may deselect user interface element 82 to prevent an inadvertent performing of an action associated with user interface element 82, and may alter the visual appearance of user interface element 84 to indicate that user interface element 82 is deselected. Conversely, responsive to computing device 2 determining that it has received the indication of user input 86 at the region of UID 4 within the predefined period of time subsequent to receiving the indication of user input 84, computing device 2 may activate user interface element 82.

Figure 6:
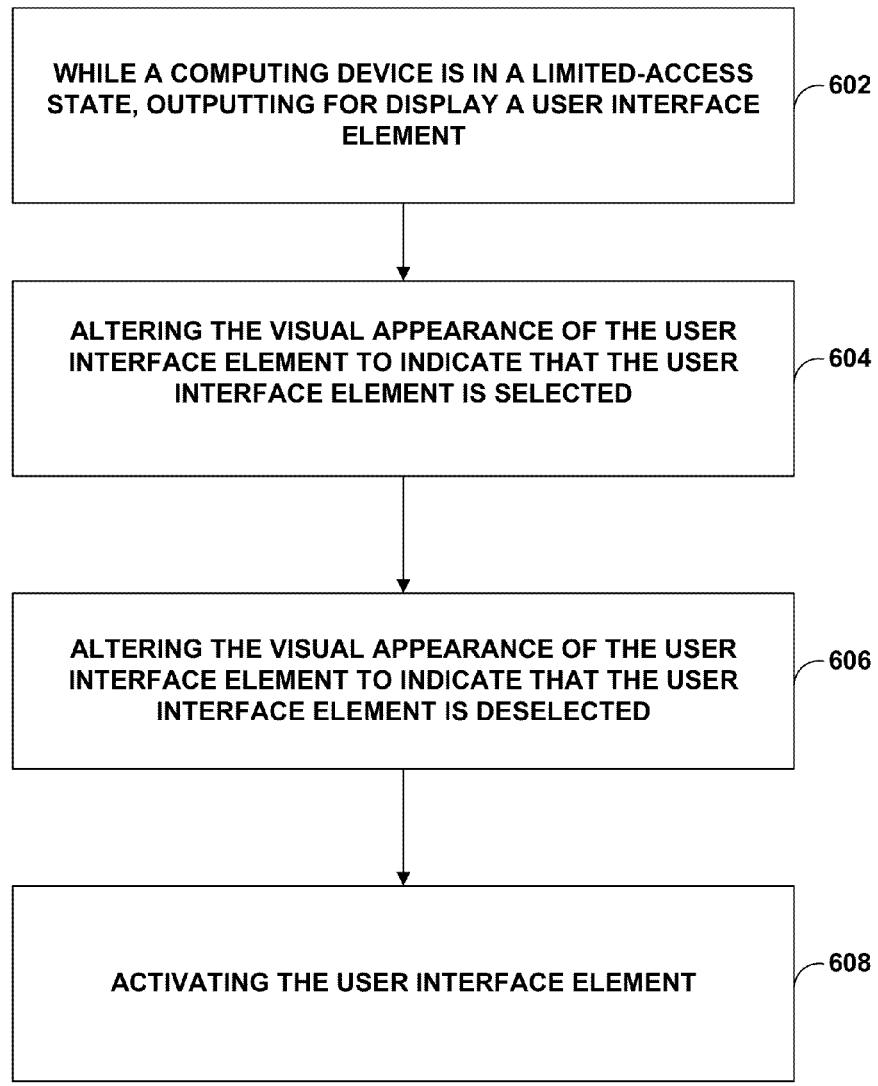
FIG. 6 is a flowchart illustrating an example process for preventing inadvertent user activation of user interface elements in accordance with one or more aspects of the present disclosure.

FIG. 6 is a flowchart illustrating an example process for preventing inadvertent user activation of user interface elements in accordance with one or more aspects of the present disclosure. The process is described within the context of computing device 2 of FIG. 1, FIG. 2, and FIGS. 4A-4E. As shown in FIG. 6, the process may include, while computing device 2 is in a limited-access state, outputting, by computing device 2 and for display, a user interface element, such as user interface element 14A (602). The process may further include responsive to receiving an indication of a first user input 418 at a region of a presence-sensitive input device 4 that corresponds to at least a portion of the user interface element 14A as displayed, altering, by computing device 2, a visual appearance of the user interface element 14A to indicate that the user interface element 14A is selected (604). The process may further include responsive to determining that computing device 2 has not received an indication of a second user input 420 at the region of the presence-sensitive input device 4 within a predefined period of time subsequent to receiving the indication of the first user input 418, altering, by computing device 2, the visual appearance of the user interface element 14A to indicate that the user interface element 14A is deselected (606). The process may further include responsive to determining that computing device 2 has received the indication of the second user input 420 at the region of the presence-sensitive input device 4 within the predefined period of time subsequent to receiving the indication of the first user input 418, activating by computing device 2, the user interface element 14A (608).

In some examples, the second user input 420 is within a threshold distance on the presence-sensitive display 4 from a location of the first user input 418 on the presence-sensitive display 4. In some examples, the indication of the first user input 418 comprises an indication of a drag gesture. In some examples, altering, by computing device 2, the visual appearance of the user interface element 14A to indicate that the user interface element 14A is selected further comprises: altering at least one of: a size of the user interface element 14A, an opacity of the user interface element 14A, a color of the user interface element 14A, a style of text of the user interface element 14A, an icon within the user interface element 14A, and a darkness of the user interface element 14A.

In some examples, altering, by computing device 2, the visual appearance of the user interface element 14A to indicate that the user interface element 14A is selected further comprises: outputting a second user interface element (e.g., user interface element 70A and/or 70B) at the region of the presence-sensitive input device 4 that corresponds to at least the portion of the user interface element 14A as displayed. In some examples, determining that computing device 2 has received the indication of the second user input 420 at the region of the presence-sensitive input device 4 within the predefined period of time subsequent to receiving the indication of the first user input 418 further comprises: determining that computing device 2 has received the indication of the second user input at a second region of the presence-sensitive input device 4 that corresponds to at least a portion of the second user interface element (e.g., user interface element 70A and/or 70B) as displayed.

In some examples, activating, by computing device 2, the user interface element includes performing, by computing device 2, an action associated with the user interface element. In some examples, performing, by computing device 2, the action associated with the user interface element 14A comprises launching, by computing device 2, an application associated with user interface element 14A. In some examples, performing, by computing device 2, the action associated with the user interface element 14A comprises outputting, by computing device 2, data associated with the user interface element 14A that is additional to data included in the user interface element 14A. In some examples, activating, by computing device 2, the user interface element 14A further includes outputting, by computing device 2 and for display, an authentication interface, receiving, by computing device 2, an indication of a third user input; and determining, by computing device 2, whether to authorize performance of an action associated with the user interface element 14A based at least in part on the third user input.

In some examples, the user interface element 14A is a visual alert indicative of receipt of notification data. In some examples, determining that computing device 2 has received the indication of the second user input 420 at the region of the presence-sensitive input device 4 within the predefined period of time subsequent to receiving the indication of the first user input 418 further comprises: determining that computing device 2 has not received an indication of a third user input outside of the region of the presence-sensitive input device 4 prior to receiving the indication of the second user input 420 at the region of the presence-sensitive input device 4.

In some examples, altering, by computing device 2, the visual appearance of the user interface element 14A to indicate that the user interface element 14A is deselected may further include altering, by computing device 2, the visual appearance of the user interface element 14A so that the visual appearance is the same as the visual appearance of the user interface element 14A prior to the selection of the user interface element 14A.

Example 1

A method comprising: while a computing device is in a limited-access state, outputting, by the computing device and for display, a user interface element; responsive to receiving, by the computing device, an indication of a first user input at a region of a presence-sensitive input device that corresponds to at least a portion of the user interface element as displayed, altering, by the computing device, a visual appearance of the user interface element to indicate that the user interface element is selected; responsive to determining that the computing device has not received an indication of a second user input at the region of the presence-sensitive input device within a predefined period of time subsequent to receiving the indication of the first user input, altering, by the computing device, the visual appearance of the user interface element to indicate that the user interface element is deselected; and responsive to determining that the computing device has received the indication of the second user input at the region of the presence-sensitive input device within the predefined period of time subsequent to receiving the indication of the first user input, activating, by the computing device, the user interface element.

Example 2

The method of Example 1, wherein the second user input is within a threshold distance on the presence-sensitive input device from a location of the first user input on the presence-sensitive input device.

Example 3

The method of any of Examples 1-2, wherein the indication of the first user input comprises an indication of a drag gesture.

Example 4

The method of any of Examples 1-3, wherein altering, by the computing device, the visual appearance of the user interface element to indicate that the user interface element is selected further comprises: altering at least one of: a size of the user interface element, an opacity of the user interface element, a color of the user interface element, a style of text of the user interface element, an icon within the user interface element, and a darkness of the user interface element.

Example 5

The method of any of Examples 1-4, wherein altering, by the computing device, the visual appearance of the user interface element to indicate that the user interface element is selected further comprises: outputting a second user interface element at the region of the presence-sensitive input device that corresponds to at least the portion of the user interface element as displayed.

Example 6

The method of any of Examples 1-5, wherein determining that the computing device has received the indication of the second user input at the region of the presence-sensitive input device within the predefined period of time subsequent to receiving the indication of the first user input further comprises: determining that the computing device has received the indication of the second user input at a second region of the presence-sensitive input device that corresponds to at least a portion of the second user interface element as displayed.

Example 7

The method of any of Examples 1-6, wherein activating, by the computing device, the user interface element further comprises: performing, by the computing device, an action associated with the user interface element.

Example 8

The method of any of Examples 1-6, wherein performing, by the computing device, the action associated with the user interface element comprises launching, by the computing device, an application associated with the user interface element.

Example 9

The method of any of Examples 1-7, wherein performing, by the computing device, the action associated with the user interface element comprises outputting, by the computing device, data associated with the user interface element that is additional to data included in the user interface element.

Example 10

The method of any of Examples 1-9, wherein activating, by the computing device, the user interface element further comprises: outputting, by the computing device and for display, an authentication interface; receiving, by the computing device, an indication of a third user input; and determining, by the computing device, whether to authorize performance of an action associated with the user interface element based at least in part on the third user input.

Example 11

The method of any of Examples 1-10, wherein the user interface element is a visual alert indicative of receipt of notification data.

Example 12

The method of any of Examples 1-11, wherein determining that the computing device has received the indication of the second user input at the region of the presence-sensitive input device within the predefined period of time subsequent to receiving the indication of the first user input further comprises: determining that the computing device has not received an indication of a third user input outside of the region of the presence-sensitive input device prior to receiving the indication of the second user input at the region of the presence-sensitive input device.

Example 13

The method of any of Examples 1-12, wherein altering, by the computing device, the visual appearance of the user interface element to indicate that the user interface element is deselected comprises: altering, by the computing device, the visual appearance of the user interface element so that the visual appearance is the same as the visual appearance of the user interface element prior to the selection of the user interface element.

Example 14

A computer-readable storage medium encoded with instructions that, when executed, cause at least one processor of a computing device to: while the computing device is in a limited-access state, output, for display, a user interface element; responsive to receiving an indication of a first user input at a region of a presence-sensitive input device that corresponds to at least a portion of the user interface element as displayed, alter the visual appearance of the user interface element to indicate that the user interface element is selected; responsive to determining that the computing device has not received an indication of a second user input at the region of the presence-sensitive input device within a predefined period of time subsequent to receiving the indication of the first user input, alter the visual appearance of the user interface element so that the visual appearance of the user interface element is identical to the visual appearance of the user interface element prior to the selection of the user interface element; and responsive to determining that the computing device has received the indication of the second user input at the region of the presence-sensitive input device within the predefined period of time subsequent to receiving the indication of the first user input, perform an action associated with the user interface element.

Example 15

The computer-readable storage medium of Example 14, wherein the second user input is within a threshold distance on the presence-sensitive input device from a location of the first user input on the presence-sensitive input device.

Example 16

The computer-readable storage medium of any of Examples 14-15, wherein the instructions that, when executed, cause the at least one processor of the computing device to alter the visual appearance of the user interface element to indicate that the user interface element is selected further comprises: instructions that, when executed, cause the at least one processor to output a second user interface element at the region of the presence-sensitive input device that corresponds to at least the portion of the user interface element as displayed.

Example 17

The computer-readable storage medium of any of Examples 14-16, wherein the instructions that, when executed, cause the at least one processor of the computing device to determine that the computing device has received the indication of the second user input at the region of the presence-sensitive input device within the predefined period of time subsequent to receiving the indication of the first user input further comprises: instructions that, when executed, cause the at least one processor to determine that the computing device has received the indication of the second user input at a second region of the presence-sensitive input device that corresponds to at least a portion of the second user interface element as displayed.

Example 18

The computer-readable storage medium of any of Examples 14-17, wherein the instructions that, when executed, cause the at least one processor of the computing device to determine that the computing device has received the indication of the second user input at the region of the presence-sensitive input device within the predefined period of time subsequent to receiving the indication of the first user input further comprises: instructions that, when executed, cause the at least one processor to determine that the computing device has not received an indication of a third user input outside of the region of the presence-sensitive input device prior to receiving the indication of the second user input at the region of the presence-sensitive input device.

Example 19

A computing system comprising: at least one processor; a presence-sensitive input device; and at least one module operable by the at least one processor to: while the computing system is in a limited-access state, output for display a user interface element responsive to receiving an indication, by the computing system, of a first user input at a region of the presence-sensitive input device that corresponds to at least a portion of the user interface element as displayed, alter the visual appearance of the user interface element to indicate that the user interface element is selected; responsive to determining that the computing system has not received an indication of a second user input at the region of the presence-sensitive input device within a predefined period of time subsequent to receiving the indication of the first user input, alter the visual appearance of the user interface element to indicate that the user interface element is deselected; and responsive to determining that the computing system has received the indication of the second user input at the region of the presence-sensitive input device within the predefined period of time subsequent to receiving the indication of the first user input, perform an action associated with the user interface element.

Example 20

The computing system of Example 19, wherein the second user input is within a threshold distance on the presence-sensitive input device from a location of the first user input on the presence-sensitive input device.

Example 21

The computing system of any of Examples 19-20, wherein the at least one module is further operable by the at least one processor to: determine that the computing device has not received an indication of a third user input outside of the region of the presence-sensitive input device prior to receiving the indication of the second user input at the region of the presence-sensitive input device.

Example 22

The computing system of any of Examples 19-21, wherein the indication of the first user input comprises an indication of a drag gesture.

Example 23

The computing system of any of Examples 19-22, wherein the user interface element is a visual alert indicative of receipt of notification data.

Example 24

A computing device comprising while a computing device is in a limited-access state, means for outputting, by the computing device and for display, a user interface element; responsive to receiving an indication, by the computing device of a first user input at a region of a presence-sensitive input device that corresponds to at least a portion of the user interface element as displayed, means for altering, by the computing device, a visual appearance of the user interface element to indicate that the user interface element is selected; responsive to determining that the computing device has not received an indication of a second user input at the region of the presence-sensitive input device within a predefined period of time subsequent to receiving the indication of the first user input, means for altering, by the computing device, the visual appearance of the user interface element to indicate that the user interface element is deselected; and responsive to determining that the computing device has received the indication of the second user input at the region of the presence-sensitive input device within the predefined period of time subsequent to receiving the indication of the first user input, means for activating, by the computing device, the user interface element.

Example 25

A computing device comprising means for performing the method of any of Examples 1-13.

Example 26

The method of any of Examples 1-13, wherein the presence-sensitive input device is not physically integrated with the computing device, and wherein the presence-sensitive input device is operatively coupled to the computing device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method comprising:
while a computing device is in a limited-access state, outputting, by the computing device and for display, a user interface element in an unselected state;
responsive to receiving an indication, by the computing device, of a first user input at a region of a presence-sensitive input device that corresponds to at least a portion of the user interface element as displayed, transitioning, by the computing device, the user interface element from the unselected state to a selected state, including altering, by the computing device, a visual appearance of the user interface element to indicate that the user interface element is selected;
responsive to determining that the computing device has not received an indication of a second user input at the region of the presence-sensitive input device within a predefined period of time subsequent to receiving the indication of the first user input, transitioning, by the computing device, the user interface element from the selected state to the unselected state, including altering, by the computing device, the visual appearance of the user interface element to indicate that the user interface element is unselected; and
responsive to determining that the computing device has received the indication of the second user input at the region of the presence-sensitive input device while the user interface element is in the selected state and within the predefined period of time subsequent to receiving the indication of the first user input, activating, by the computing device, the user interface element,
wherein at least one of the first user input or the second user input comprises a tap gesture.

2. The method of claim 1, wherein the second user input is within a threshold distance on the presence-sensitive input device from a location of the first user input on the presence-sensitive input device.

3. The method of claim 1, wherein the indication of the first user input comprises an indication of a drag gesture.

4. The method of claim 1, wherein altering, by the computing device, a visual appearance of the user interface element to indicate that the user interface element is selected further comprises:

altering at least one of: a size of the user interface element, an opacity of the user interface element, a color of the user interface element, a style of text of the user interface element, an icon within the user interface element, and a darkness of the user interface element.

5. The method of claim 1, wherein altering, by the computing device, a visual appearance of the user interface element to indicate that the user interface element is selected further comprises:
outputting a second user interface element at the region of the presence-sensitive input device that corresponds to at least the portion of the user interface element as displayed.

6. The method of claim 5, wherein determining that the computing device has received the indication of the second user input at the region of the presence-sensitive input device within the predefined period of time subsequent to receiving the indication of the first user input further comprises:
determining that the computing device has received the indication of the second user input at a second region of the presence-sensitive input device that corresponds to at least a portion of the second user interface element as displayed.

7. The method of claim 1, wherein activating, by the computing device, the user interface element further comprises:
performing, by the computing device, an action associated with the user interface element.

8. The method of claim 7, wherein performing, by the computing device, the action associated with the user interface element comprises launching, by the computing device, an application associated with the user interface element.

9. The method of claim 7, wherein performing, by the computing device, the action associated with the user interface element comprises outputting, by the computing device, data associated with the user interface element that is additional to data included in the user interface element.

10. The method of claim 1, wherein activating, by the computing device, the user interface element further comprises:
outputting, by the computing device and for display, an authentication interface;
receiving, by the computing device, an indication of a third user input; and
determining, by the computing device, whether to authorize performance of an action associated with the user interface element based at least in part on the third user input.

11. The method of claim 1, wherein the user interface element is a visual alert indicative of receipt of notification data.

12. The method of claim 1, wherein determining that the computing device has received the indication of the second user input at the region of the presence-sensitive input device within the predefined period of time subsequent to receiving the indication of the first user input further comprises:
determining that the computing device has not received an indication of a third user input outside of the region of the presence-sensitive input device prior to receiving the indication of the second user input at the region of the presence-sensitive input device.

13. The method of claim 1, wherein altering, by the computing device, the visual appearance of the user interface element to indicate that the user interface element is unselected comprises:
altering, by the computing device, the visual appearance of the user interface element so that the visual appearance is the same as the visual appearance of the user interface element prior to the selection of the user interface element.

14. A computer-readable storage medium encoded with instructions that, when executed, cause at least one processor of a computing device to:
while the computing device is in a limited-access state, output, for display, a user interface element in an unselected state;
responsive to receiving an indication of a first user input at a region of a presence-sensitive input device that corresponds to at least a portion of the user interface element as displayed, transition the user interface element from the unselected state to a selected state, including alter the visual appearance of the user interface element to indicate that the user interface element is selected;
responsive to determining that the computing device has not received an indication of a second user input at the region of the presence-sensitive input device within a predefined period of time subsequent to receiving the indication of the first user input, transition the user interface element from the selected state to the unselected state, including alter the visual appearance of the user interface element so that the visual appearance of the user interface element is identical to the visual appearance of the user interface element prior to the selection of the user interface element; and
responsive to determining that the computing device has received the indication of the second user input at the region of the presence-sensitive input device while the user interface element is in the selected state and within the predefined period of time subsequent to receiving the indication of the first user input, perform an action associated with the user interface element;
wherein at least one of the first user input and the second user input comprises a tap gesture.

15. The computer-readable storage medium of claim 14, wherein the second user input is within a threshold distance on the presence-sensitive input device from a location of the first user input on the presence-sensitive input device.

16. The computer-readable storage medium of claim 14, wherein the instructions that, when executed, cause the at least one processor of the computing device to alter the visual appearance of the user interface element to indicate that the user interface element is selected further comprises:
instructions that, when executed, cause the at least one processor to output a second user interface element at the region of the presence-sensitive input device that corresponds to at least the portion of the user interface element as displayed.

17. The computer-readable storage medium of claim 16, wherein determine that the computing device has received the indication of the second user input at the region of the presence-sensitive input device within the predefined period of time subsequent to receiving the indication of the first user input further comprises:
instructions that, when executed, cause the at least one processor to determine that the computing device has received the indication of the second user input at a second region of the presence-sensitive input device that corresponds to at least a portion of the second user interface element as displayed.

18. The computer-readable storage medium of claim 14, wherein the instructions that, when executed, cause the at least one processor of the computing device to determine that the computing device has received the indication of the second user input at the region of the presence-sensitive input device within the predefined period of time subsequent to receiving the indication of the first user input further comprises:
    instructions that, when executed, cause the at least one processor to determine that the computing device has not received an indication of a third user input outside of the region of the presence-sensitive input device prior to receiving the indication of the second user input at the region of the presence-sensitive input device.

19. A computing system comprising:
at least one processor;
a presence-sensitive input device; and
at least one module operable by the at least one processor to:
    while the computing system is in a limited-access state, output, for display, a user interface element in an unselected state;
    responsive to receiving an indication, by a computing device, of a first user input at a region of the presence-sensitive input device that corresponds to at least a portion of the user interface element as displayed, transition the user interface element from the unselected state to a selected state, including alter the visual appearance of the user interface element to indicate that the user interface element is selected;
    responsive to determining that the computing system has not received an indication of a second user input at the region of the presence-sensitive input device within a predefined period of time subsequent to receiving the indication of the first user input, transition the user interface element from the selected state to the unselected state, including alter the visual appearance of the user interface element to indicate that the user interface element is unselected; and
    responsive to determining that the computing system has received the indication of the second user input at the region of the presence-sensitive input device while the user interface element is in the selected state and within the predefined period of time subsequent to receiving the indication of the first user input, perform an action associated with the user interface element;
    wherein at least one of the first user input and the second user input comprises a tap gesture.

20. The computing system of claim 19, wherein the second user input is within a threshold distance on the presence-sensitive input device from a location of the first user input on the presence-sensitive input device.

21. The computing system of claim 19, wherein the at least one module is further operable by the at least one processor to:
    determine that the computing device has not received an indication of a third user input outside of the region of the presence-sensitive input device prior to receiving the indication of the second user input at the region of the presence-sensitive input device.

22. The computing system of claim 19, wherein the indication of the first user input comprises an indication of a drag gesture.

23. The computing system of claim 19, wherein the user interface element is a visual alert indicative of receipt of notification data.

* * * * *